United States Patent [19]

Allen

[11] Patent Number: 5,337,960

[45] Date of Patent: Aug. 16, 1994

[54] PORTABLE SUPPORT APPARATUS FOR EVAPORATIVE COOLING

[76] Inventor: William G. Allen, 1575 Sunny Dunes Rd., Palm Springs, Calif. 92264

[21] Appl. No.: 932,223

[22] Filed: Aug. 19, 1992

[51] Int. Cl.⁵ .............................................. B05B 15/06
[52] U.S. Cl. .................................... 239/280.5; 248/83; 248/910
[58] Field of Search ................ 239/273, 276, 280–281, 239/14.1; 248/910, 83, 76

[56] References Cited

U.S. PATENT DOCUMENTS

| 807,184 | 12/1905 | Malnburg | 248/83 |
|---|---|---|---|
| 1,187,349 | 6/1916 | Libby | 239/723 |
| 1,204,309 | 11/1916 | Peterson | 239/280 |
| 1,207,790 | 12/1916 | Peterson | 239/280 |
| 1,368,416 | 2/1921 | Thomas | 239/280 |
| 2,242,840 | 5/1941 | Warden, Sr. | 248/83 |
| 2,665,171 | 1/1954 | Stievater | 239/280 |
| 2,694,600 | 11/1954 | Richey | 239/280 |
| 2,792,257 | 5/1957 | Davis | 239/276 |
| 2,910,245 | 10/1959 | Burroughs | 239/167 |
| 2,988,287 | 6/1961 | Sherman | 239/177 |
| 3,140,827 | 7/1964 | Fletcher | 239/728 |
| 3,870,235 | 3/1975 | Newell | 239/159 |
| 4,824,020 | 4/1989 | Harward | 239/280 |

FOREIGN PATENT DOCUMENTS

| 339229 | 1/1905 | France | 239/164 |
|---|---|---|---|
| 9034 | of 1910 | United Kingdom | 239/159 |
| 682570 | 11/1952 | United Kingdom | 239/177 |
| 896992 | 5/1962 | United Kingdom | 239/280.5 |
| 1154369 | 6/1969 | United Kingdom | 239/276 |

*Primary Examiner*—Andres Kashnikow
*Assistant Examiner*—Karen B. Merritt

[57] ABSTRACT

A lightweight, portable and collapsible support apparatus for pressurized water conveyance and overhead mist spraying nozzles (88). A single rear elongated leg (2) extends outwardly to the rear of the apparatus. Two front elongated legs (3R, 3L) extend forwardly and laterally outward in a substantially oblique direction, and are pivotally attached to the rear leg (2), such that the front legs (3R, 3L) can be folded up into a longitudinal bundle for easy carrying and stowing. A boom (30) is demountably attached to the upper end-portion of the rear leg (2), and extends forwardly upward in substantial alignment with the rear leg (2). A garden hose (39) supplies water to the boom (30), which delivers the water up to an overhead branch arm assembly (80), which is demountably and pivotally attached to the upper extremity of the boom (30). The branch arm assembly (80) comprises a plurality of branch arms (81) with mist spraying nozzles (88) attached thereto. A truss support system (60) provides support for the boom (30). Support guys (94), a flexible support stay (98), and a support tie (102) provide for support and positioning of the branch arm assembly (80). Flexible water conduit (106), together with a quick-disconnect coupling (107) and an in-line filter (108), delivers water from the boom (30) to individual branch arms (81). A counterweight member (13) is attached to the lower end of the rear leg (2) for counter-balancing the forward overhang weight of the support apparatus. A temporary support leg (43) supports the apparatus when it is tilted forward and down for the installation and removal of the branch arm assembly (80).

6 Claims, 13 Drawing Sheets

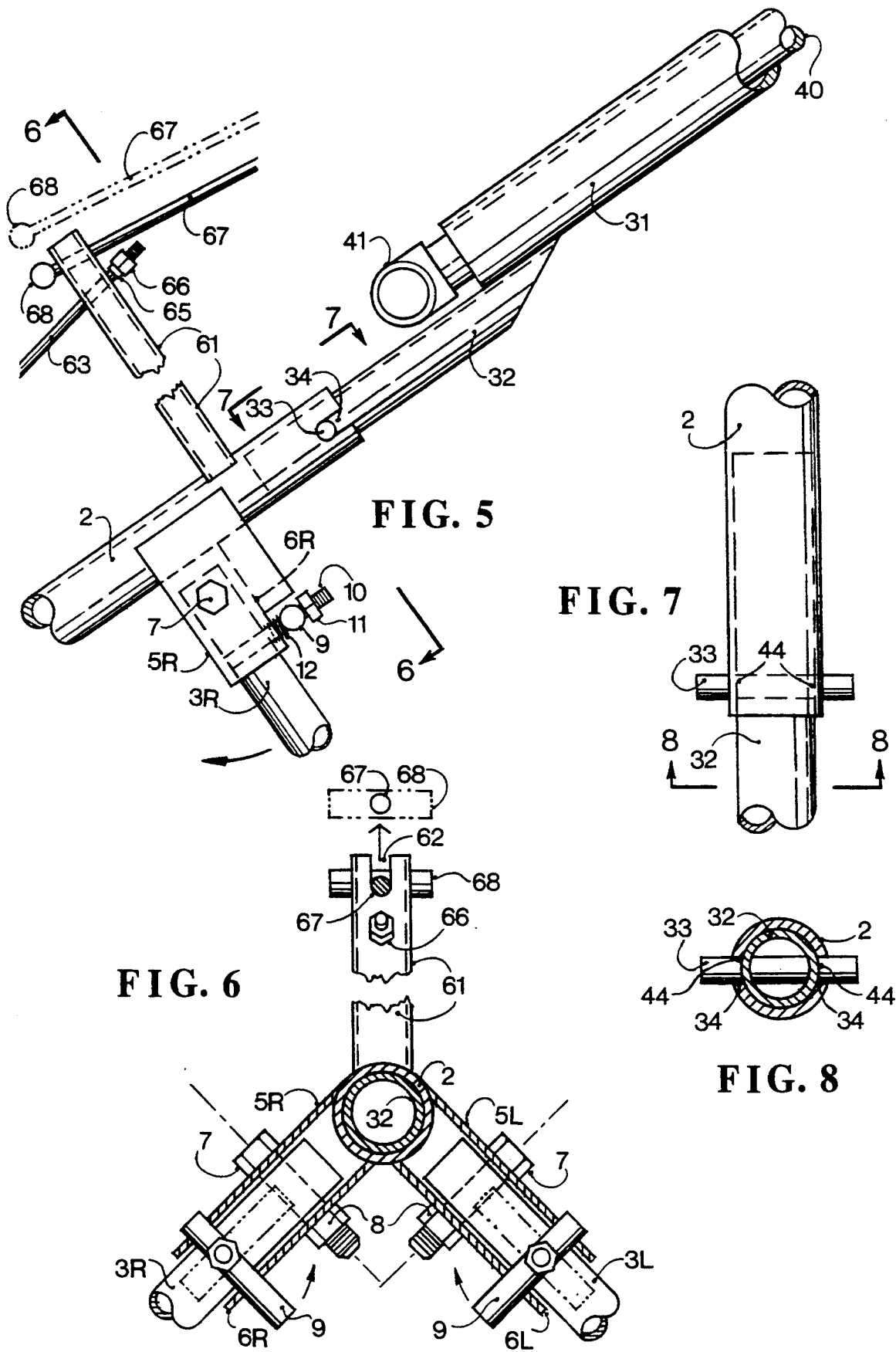

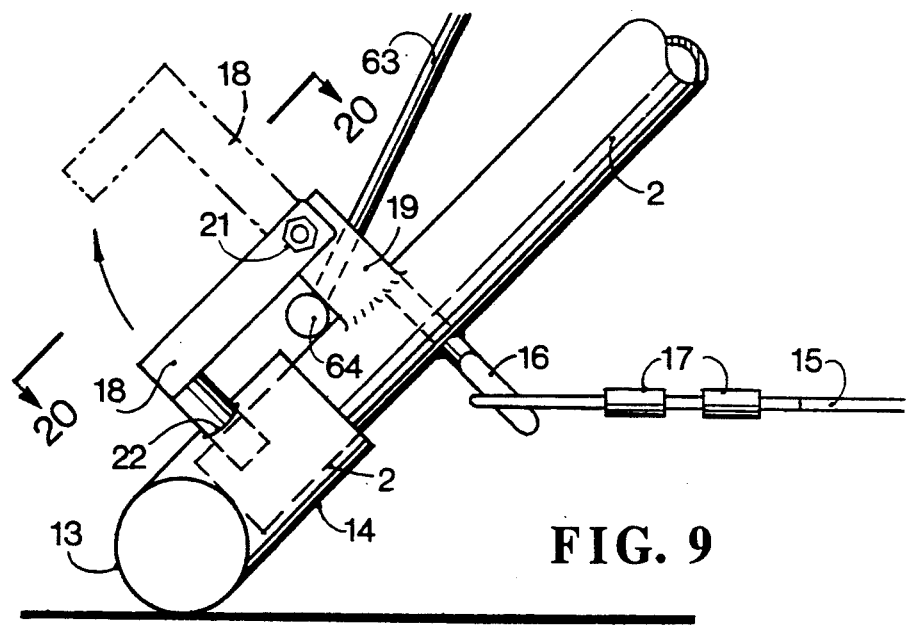
FIG. 9
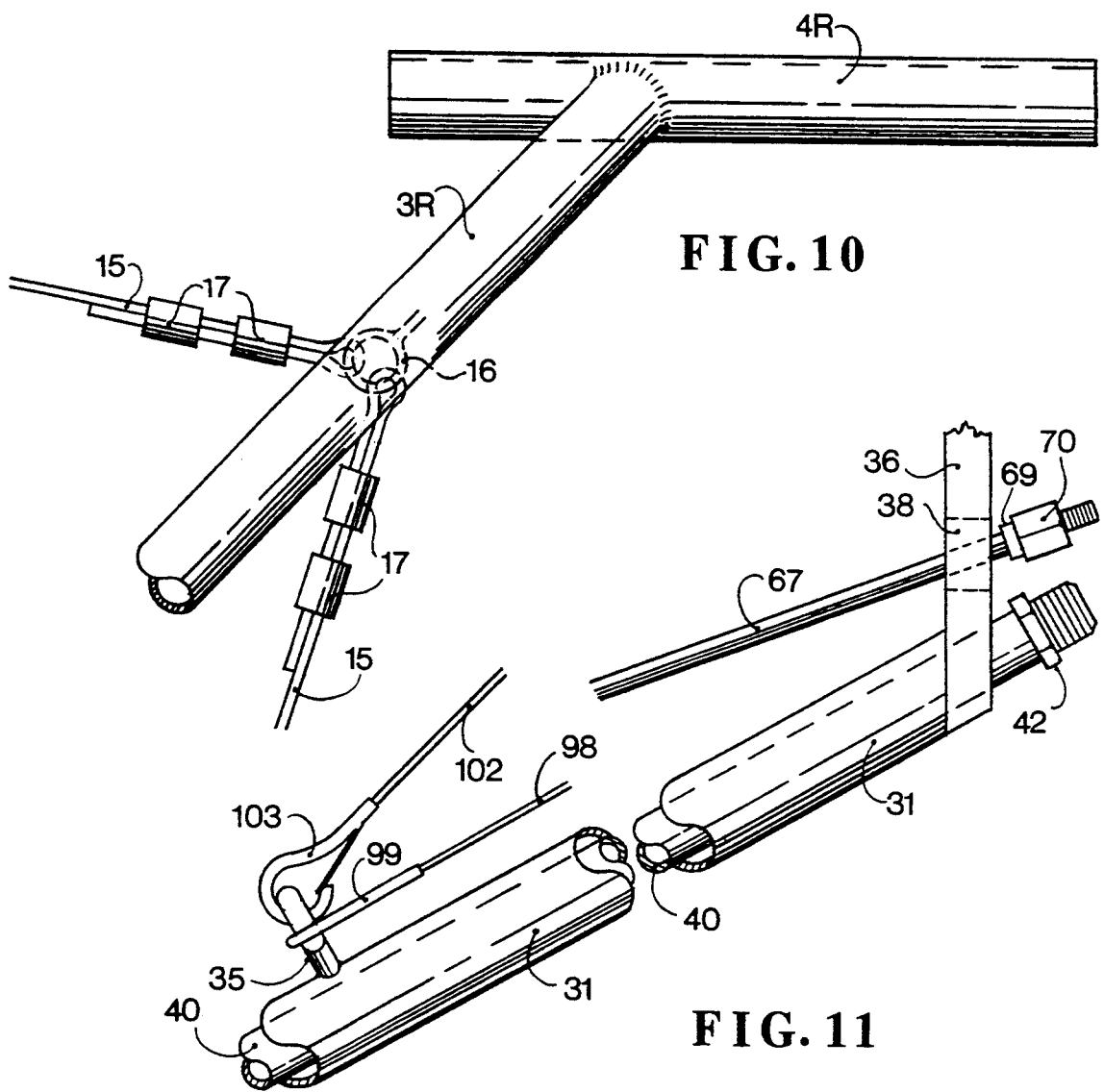
FIG. 10
FIG. 11

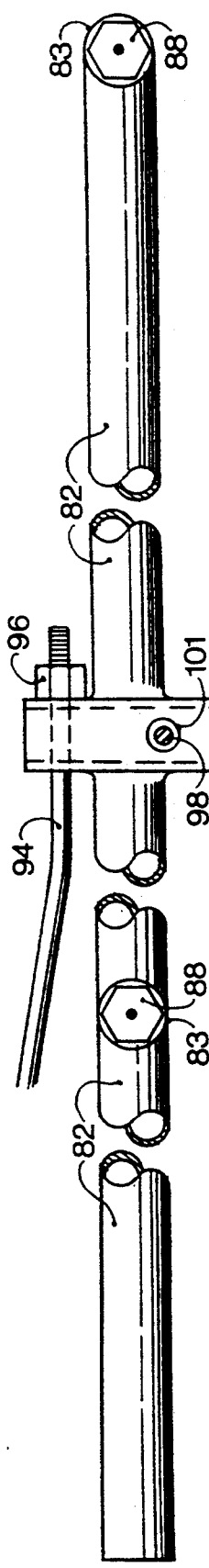
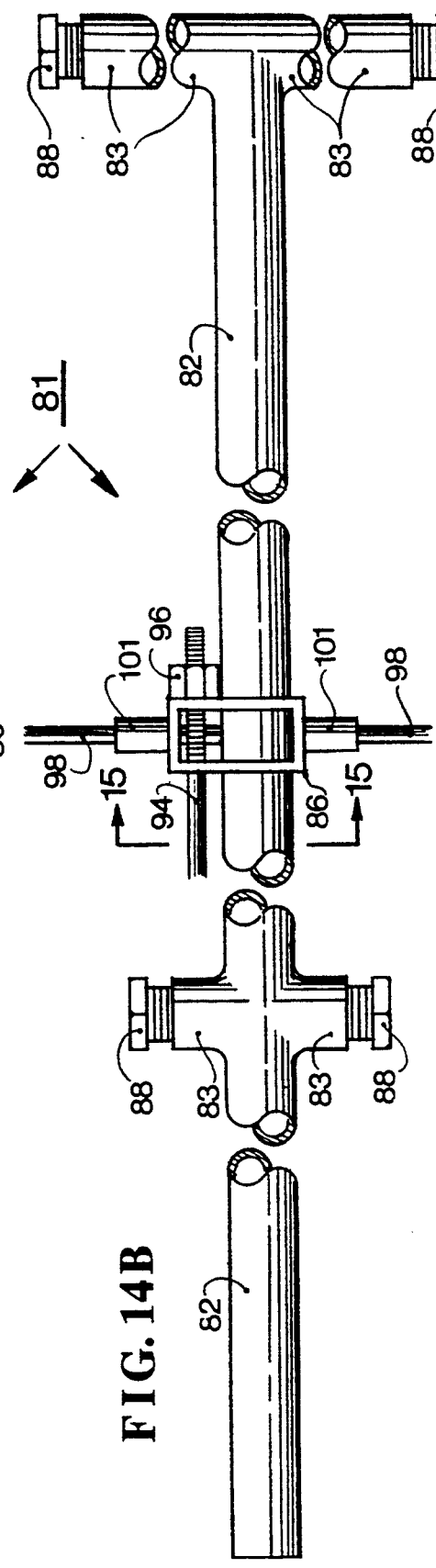
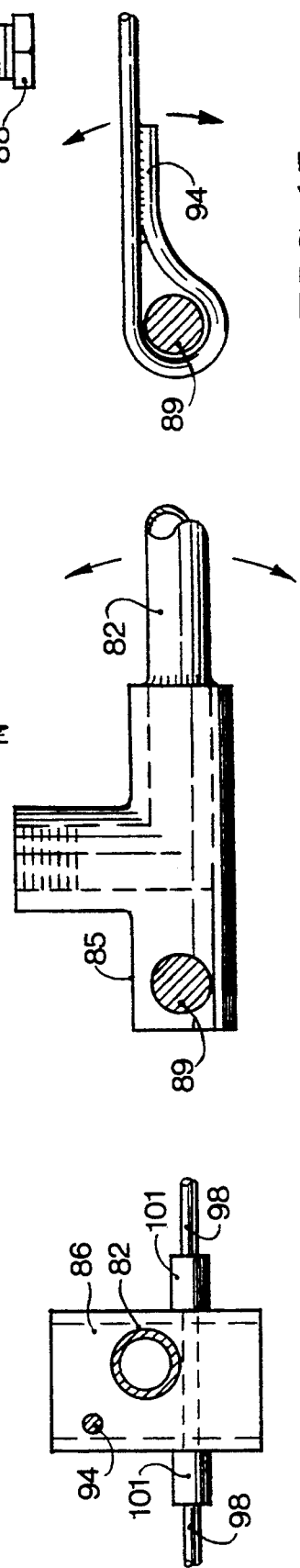

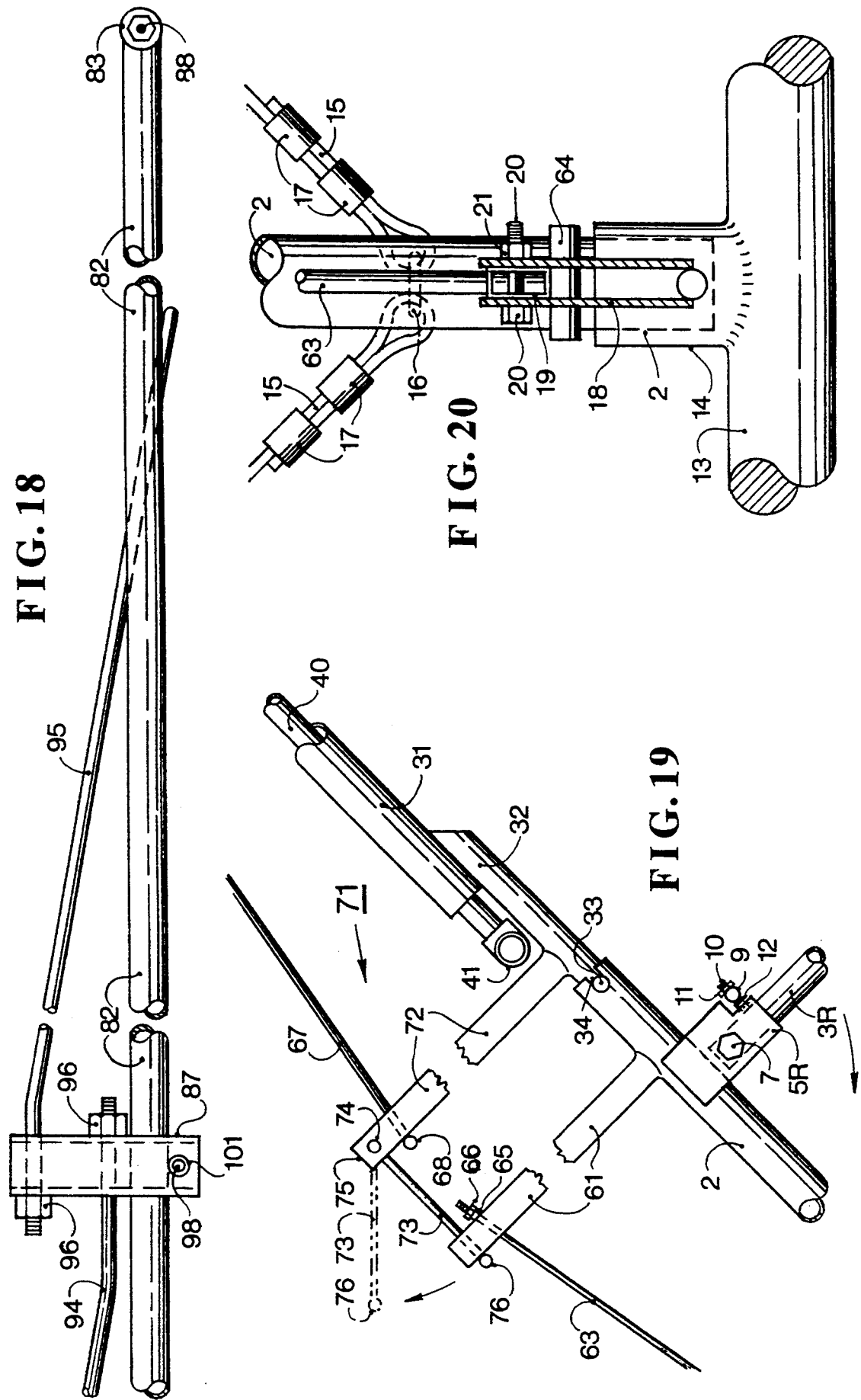

PORTABLE SUPPORT APPARATUS FOR EVAPORATIVE COOLING

BACKGROUND OF THE INVENTION

This invention relates to evaporative cooling, specifically, to a lightweight, portable and collapsible support apparatus for pressurized water conveyance and overhead mist spraying nozzles.

1. General Problem

There has long been a need for providing a portable elevated or overhead evaporative cooling system for use in outdoor and in open or free areas in arid and hot climates throughout the world.

Such a system or support apparatus must be of sufficient height above the ground to provide enough clearance for humans to perform working, sporting, and entertainment tasks. Also, sufficient height should be maintained to provide the spraying mist with adequate vertical travel distance to be absorbed or evaporated into the air. In addition to temperature, other factors such as prevailing humidity and wind must also be considered in determining the height of the support apparatus.

Such a support apparatus must be capable of providing spraying mist over a target or spray pattern area of several hundred square feet, without any significant apparatus intrusion into the target area, to be of any practical value. Further, the apparatus should be relatively quick and easy to assemble and disassemble. Still further, the apparatus should be lightweight enough to be easily lifted off the ground and moved a short distance when fully assembled. Finally, when the apparatus is disassembled, it should be relatively easy to stowe and to transport from one location to another.

The specific uses for such a support apparatus are many. For example: (1) Cooling humans, who are entertaining or performing work tasks; (2) Cooling other animals, such as domestic pets, poultry and livestock; and (3) cooling plant life, such as in private gardens and commercial nurseries.

BACKGROUND—DESCRIPTION OF PRIOR ART

Fixed-Type Systems

Heretofore, the use of mist spraying nozzles for evaporative cooling in outside areas has been primarily limited to fixed or permanently mounted systems. In these systems, the spraying nozzles, together with their water supplying conduit, are affixed to the outside of a building or to a patio framework.

A variation of the fixed-type systems is where the spraying nozzles, together with their water supplying conduit, are attached to a flexible cable or a rigid beam. The cable or beam is placed over an outside area, such as a patio, with each of its ends attached to a building or a similar structure for support.

Still, another variation of the fixed-type systems is a product that is sold under the trade name SPIN MIST. In this system, a single nozzle, together with an electric driven fan, is connected to the outer end of a boom. The boom is attached to the outside of a building or a patio framework. The fan then disperses the nozzle spray over a spray pattern area of approximately 150 square feet.

The above fixed-type systems, although not germane for the intended purpose of this invention, are described here to give the reader a more complete understanding of the state of the art.

Agricultural Irrigators

Historically, portable systems for spraying water have been primarily limited to agricultural irrigation. The majority of these systems are vehicularly mounted, either on trucks or trailers, and move across a field of crops, spraying water and other fluids relatively close to the ground. A vehicular mounted system would be very expensive to build and operate, and would also be very impractical for the intended purpose of this invention.

A variation of portable irrigation systems is disclosed in U.S. Pat., H.T. Libby, No. 1,187,349, Jun. 13, 1916. In this system, multiple supports stands, which are several feet high and positioned several feet apart, support horizontal beams with water conduit and nozzles attached. This system would be very time consumming to assemble and disassemble, and would be very difficult to lift off the ground and move a relatively short distance, especially for one person. Also, the support stands would interfere with or intrude into the spray pattern area.

Another variation of portable irrigation systems is disclosed in a British Patent, K.L. Donnison, NO. 682,570, Nov. 12, 1952. This system has a single support stand in the center of a rotatable horizontally mounted spraying boom and an opposing weighted balance arm. The first disadvantage of this system is the intrusion of the support stand into the target spray area. A second disadvantage of this system is that it would be difficult to assemble and disassemble if the spraying boom and balance arm were positioned 10 feet or more above the ground.

Portable Non-Agricultural Systems

One type of portable system features a single nozzle mounted on a relatively small and lightweight support stand of approximately 4 feet in height. This system delivers a fine mist spray over one or two persons sitting in a chair, or the like. A garden hose supplies water to the support stand. One such system is sold under the trade name of COOL KIT, and is manufactured by Arizona Mist, Inc., of Tempe, Ariz. This system has a very limited use due to its small spray pattern area and low height.

Another type of portable system uses a single nozzle fastened to a person's hat, or the like. A small water reservoir attaches to the person's waist, and delivers water under pressure through a flexible line up to the nozzle. One such system is sold under the trade name MISTY MATE. One disadvantage of this type of system is the weight of the reservoir and the interference of the flexible water line and nozzle with the user's movements when performing tasks. A second disadvantage to the system is the time required to replenish and pressurize the water reservoir.

Still, another type of system features several nozzles with a water reservoir mounted on a golf cart, a farm tractor, a travel trailer, as well as other similar vehicles.

OBJECTS OF THE INVENTION

It is a principal objective of the present invention to provide a lightweight, portable and collapsible support apparatus for pressurized water conveyance and overhead mist spraying nozzles for evaporative cooling, wherein the support apparatus provides a target or spray pattern area of several hundred square feet with fine mist spray, without any significant intrusion into or interference with the target area.

A second objective of the present invention is to provide such a portable support apparatus, being constructed of generally lightweight tubular materials, that can be easily lifted off the ground, by one person, and moved a relatively short distance when fully assembled.

A further objective of the present invention is to provide such a portable support apparatus that can be quickly and easily disassembled into smaller and relatively lightweight sections for easy carrying and stowing.

BRIEF SUMMARY OF THE INVENTION

The above objectives are achieved in accordance with the present invention by a novel portable and collapsible support apparatus for pressurized water conveyance and overhead evaporative cooling mist spraying nozzles. A leg support system supports and positions a forwardly and upwardly extended truss supported boom, which in turn supports and positions a forwardly extended overhead branch arm assembly, with mist spraying nozzles attached.

In the leg support system, a single rear elongated leg extends outwardly to the rear of the apparatus. Two front elongated legs are pivotally and oppositely attached to the upper end-portion of the rear leg, and extend forwardly and laterally outward a sufficient distance to ensure apparatus stability. The front legs are attached to the rear leg such that they can be moved from their extended support positions to folded up or retracted positions, lying substantially adjacent to the rear leg in a generally small and lightweight longitudinal bundle for easy carrying and stowing. Locking pins secure the front legs in their extended support positions, preventing the legs from collapsing when the apparatus is lifted off the ground and moved and when the apparatus is tilted forward and down, pivoting on the front legs, for the installation and removal of the branch arm assembly. Flexible horizontal support ties interconnect the lower end-portion of all three legs for positioning and support.

A counterweight member is perpendicularly attached to the lower end of the rear leg for counterbalancing the forward weight of the apparatus. The counterweight member is secured in place by a pivotally attached locking bolt, providing for quick and easy installation and removal.

A boom is demountably attached to the upper end of the rear leg, and extends forwardly and upwardly in substantial alignment with the longitudinal axis of the rear leg, to a minimum height of approximately 10 feet above the ground. The lower end of the boom is slidably mounted inside the rear leg, in a sleevelike manner, for easy connection and removal. The boom is prevented from rotating on its longitudinal axis by notch and pin keying. A pair of substantially upright mounting tubes are affixed to the forward or outer end of the boom, with one tube attached to each side of the boom. The upright mounting tubes allow the height of the boom to be increased without any substantial increase in its length. A separate rigid water conduit resides interiorly of the structural portion of the boom, and provides water under pressure to the branch arm assembly. A garden hose supplies water to the lower end of the conduit.

A truss post, which has a forked outer end, is affixed at substantially right angles to the top side of the upper end-portion of the rear leg. A lower truss member interconnects the outer end-portion of the truss post and the lower end-portion of the rear leg. An upper truss member interconnects the outer end of the truss post, in a detachable manner, and the forward or outer end of the boom, completing a truss support system for the boom, wherein the rear leg serves as a balance arm. The truss post's forked outer end provides for quick and easy installation and removal of both the upper truss member and the boom. The truss support system provides for a strong and relatively lightweight supporting and positioning boom.

At least one pivot post, which is the hub of the branch arm assembly, is demountably and pivotally attached to the upper end of the upright mounting tubes of the boom. The pivot post is indirectly connected to the mounting tubes through a horizontal and lateral mounting bar, which rests in the notched down lateral sides of each tube, forming substantially U-shaped mounting saddles. The mounting saddles provide the post with fore-and-aft positioning, as well as providing a means for the post to pivot in the fore-and-aft vertical plane. And, two substantially upright mounting pins, which are affixed to the mounting bar, fit inside the upright mounting tubes of the boom for lateral positioning.

A plurality of branch arms are pivotally attached to the lower portion of at least one pivot post, and extend radially outward, forming a substantially semi-circle pattern. The arms are attached to the post with each arm being placed on top of the other, in a stacking manner. Disc-like spacers are placed between each arm for sufficient vertical separation to prevent branch arm entanglement or even damage, especially when the arms are completely folded up into a relatively small longitudinal bundle for carrying and stowing. The branch arm assembly is a so-called "wet" system, wherein each arm supports and positions mist spraying nozzles, and serves as a rigid conduit for delivering water under pressure to each nozzle. At least two nozzles are mounted on each branch arm. The exact number of nozzles required depends on the length of each arm and the number of arms required to cover a desired spray pattern ares.

A plurality of support guys, with at least one support guy for each branch arm, are pivotally attached to the upper portion of one or more pivot posts. The guys extend radially outward and downward adjustably attaching to the branch arms. The guys are attached to the pivot post, or posts, in a one on top of the other or a stacking manner. Spacers are placed between each guy to prevent possible entanglement or even damage to the guys, especially when the branch arms are folded up.

At least one substantially horizontal flexible support stay interconnects each branch arm and the boom for radial positioning and support of the branch arms. Each end of the stay has a quick-release hook for easy removal from the boom.

At least one upright attachment tube is affixed, at approximate right angles, to each branch arm for two purposes. The first purpose of the tubes is to serve as attachment points for both the longitudinal connection of the support guys and the lateral connection of the flexible support stay. The second purpose of the attachment tubes is to prevent the branch arms from being completely folded up, forcing the arms to be placed on top of each other in an offsetting or staggered manner thereby eliminating the possibility of entanglement and damage to both the branch arms and support guys.

A support tie interconnects the upper end-portion of the pivot post and a connection eye affixed to the top side of the boom. The support tie carries the loads of the support guys, which are supporting the overhang weight of the branch arms.

Flexible water conduit, together with a quick disconnect coupling and an in-line filter, delivers water from the boom to the branch arms.

The branch arm assembly is attached to the boom by tilting the apparatus forward and down, pivoting on the front legs, until the boom and rear leg are in an approximate horizontal position. A temporary support leg is then connected to the front or outer end of the boom. After the branch arm assembly is installed on the outer end of the boom, and the counterweight member is attached to the outer end of the rear leg, the apparatus is then tilted up and rearward into its operating position.

Additional objects and features of the present invention will become apparent from the following detailed description, taken together with the accompanying drawings.

DRAWING FIGURES

In the drawings, flexible water conduit is illustrated schematically only, and the conduit is not shown in FIGS. 1,3,4A,4B and 11.

FIG. 5 shows the upper portion of the leg support system, the lower portion of the attached boom, and the truss post with both the lower and upper truss members attached.

FIG. 6 is a front cross section view taken along line 6—6 of FIG. 5.

FIG. 7 shows an enlarged partial plan view taken along line 7—7 of FIG. 5.

FIG. 8 is a cross section view taken along line 8—8 of FIG. 7.

FIG. 9 is a side elevation view of the lower end-portion of the rear leg, including the counterweight member, the horizontal support ties, and the lower truss member.

FIG. 10 is a plan view of the lower end-portion of the right front leg with its base member affixed, and the horizontal support ties.

FIG. 11 is a side elevation view of the outer or upper portion of the boom, with the rigid water conduit and the adjustably attached upper truss member.

FIGS. 14A and 14B are, respectively, side elevation and plan views of a single branch arm.

FIG. 15 is a cross section view taken along line 15—15 of of FIG. 14B.

FIG. 16 is a plan view of a branch arm connection fitting attached to the pivot post.

FIG. 17 is a plan view of a single support guy attached to the pivot post.

FIG. 18 is a side elevation view of the outer portion of a single branch arm with a secondary support guy attached.

FIG. 19 is a side elevation view of a dual truss post system, with a secondary post affixed to the boom, and a support link interconnecting the two posts.

FIG. 20 is a plan view of FIG. 9.

REFERENCE NUMERALS IN DRAWINGS

Figure 1:
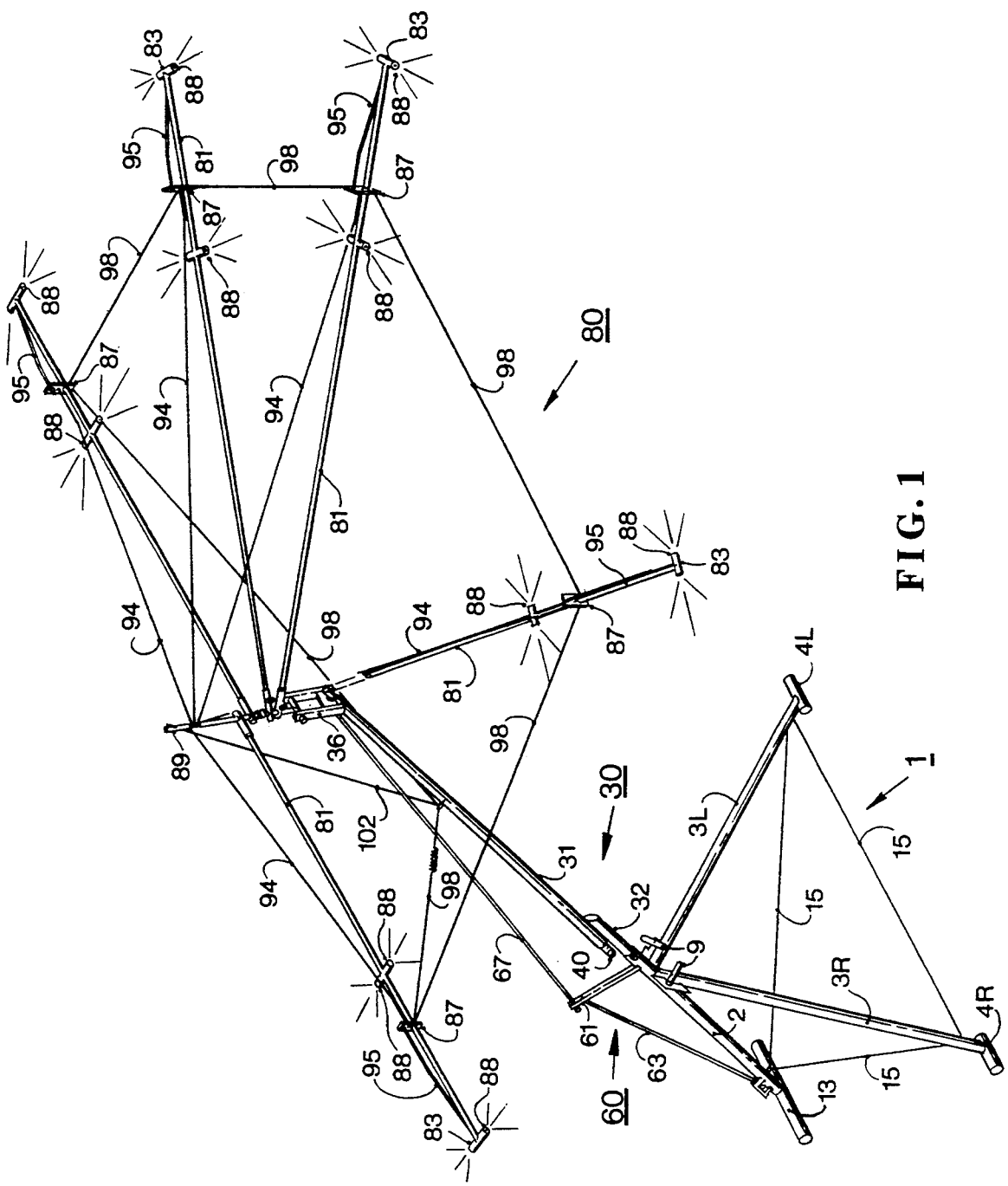
FIG. 1 is an above perspective view of the portable support apparatus.

| 1 leg support system | |
|---|---|
| 2 rear elongated leg | 11 nut (pin) |
| 3R right front elongated leg | 12 coil spring (pin) |
| 3L left front elongated leg | 13 counterweight member |
| 4R right base member | 14 connection tube |
| 4L left base member | 15 horizontal support tie |
| 5R right outer mounting plate | 16 eyebolt (tie) |
| 5L left outer mounting plate | 17 oval sleeve (tie) |
| 6R right inner mounting plate | 18 locking bolt |
| 6L left inner mounting plate | 19 mounting tube |
| 7 pivot bolt | 20 bolt |
| 8 lock nut | 21 lock nut |
| 9 locking pin | 22 drilled holes |
| 10 bolt (pin) | |
| 30 boom | |
| 31 boom tube | 38 crossmember tube |
| 32 connection tube | 39 garden hose |
| 33 pin (connection tube) | 40 rigid water conduit |
| 34 notch (rear leg) | 41 lower conduit fitting |
| 35 connection eye (boom tube) | 42 upper conduit fitting |
| 36 upright mounting tube | 43 temporary support leg |
| 37 mounting saddle | 44 drilled holes |
| 50 movable boom | |
| 51 balance arm | 54 pivot bolt |
| 52 counterweight | 55 lock nut |
| 53 mounting plate | |
| 60 truss support system | |
| 61 truss post | 66 lock nut |
| 62 forked outer end | 67 upper truss member |
| 63 lower truss member | 68 locking bar |
| 64 locking bar | 69 lock nut washer |
| 65 lock nut washer | 70 lock nut |
| 71 dual truss post system | |
| 72 secondary truss post | 75 cotter pin (not shown) |
| 73 truss support link | 76 locking bar |
| 74 pivot pin | |
| 80 branch arm assembly | |
| 81 branch arm | 95 secondary support guy |
| 82 branch arm tubing | 96 lock nut |

-continued

| | |
|---|---|
| 83 sub-branch arm | 97 spacer (guy) |
| 84 diagonal sub-branch arm | 98 flexible support stay |
| 85 connection fitting | 99 hook (stay) |
| 86 attachment tube | 100 tension spring (stay) |
| 87 extended attachment tube | 101 stop sleeve |
| 88 nozzle | 102 support tie |
| 89 pivot post | 103 hook (tie) |
| 90 mounting bar | 104 washer |
| 91 mounting pin | 105 lock nut (pivot post) |
| 92 spacer (branch arms) | 106 flexible water conduit |
| 93 cotter pin | 107 quick disconnect coupling |
| 94 support guy | 108 in-line filter |
| 114 dual pivot post system | |
| 115 lower tie member | |
| 116 upper tie member | |
| 117 jam nut | |
| 118 lock nut | |
| 119 cross member (boom) | |

DETAILED DESCRIPTION OF THE ILLUSTRATED EMBODIMENTS

A preferred embodiment of the relatively lightweight, portable, and collapsible support apparatus for pressurized water conveyance and overhead mist spraying nozzles is shown in the drawings. The support apparatus comprises a leg support system 1, a boom 30, a truss support system 60, and a branch arm assembly 80.

Overall View—FIG. 1

FIG. 1 shows an overall perspective view of the fully assembled support apparatus.

Leg Support System—FIGS. 1,2,5,6,9 and 10

The leg support system 1 comprises a single rear elongated leg 2, two front elongated legs 3R and 3L, horizontal support ties 15, and a counterweight member 13.

Rear Elongated Leg—FIGS. 1,2,5,6 and 9

As illustrated in FIGS. 1,2,5 and 9, a single rear elongated leg 2 extends outwardly and rearwardly along the longitudinal center line axis of the apparatus. Rear leg 2, which is constructed of tubular material, extends downward along an angle of elevation of approximately forty (40) degrees and from a height of approximately four (4) feet above the ground. Rear leg 2 supports and stabilizes the apparatus in the fore-and-aft direction, as well as serving as a balance arm for truss support system 60.

Two Front Elongated Legs—FIGS. 1,2,5,6 and 10

Figure 2:
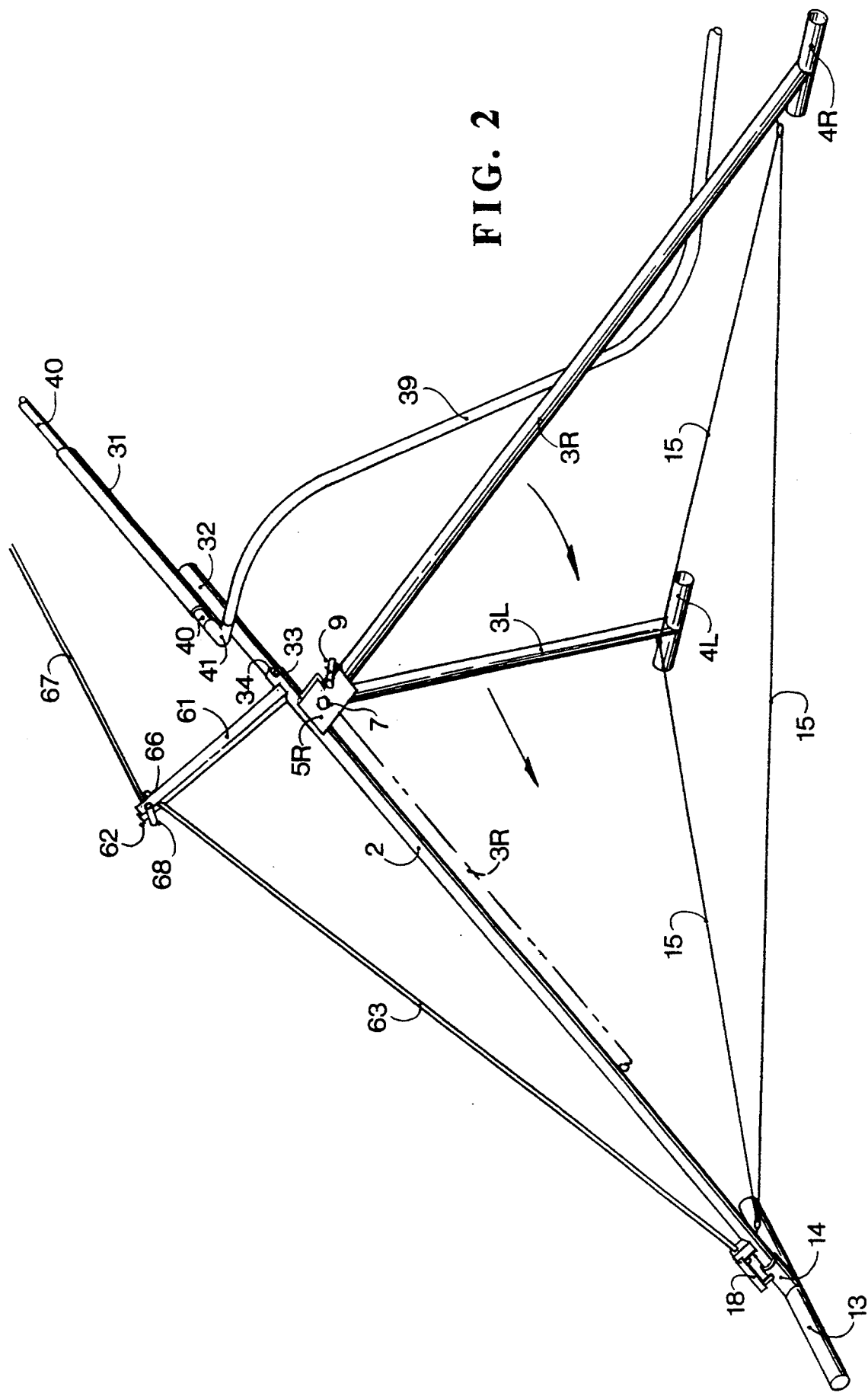
FIG. 2 is a perspective view of the leg support system, and the lower portion of the boom and truss support system.

Two front elongated legs 3R and 3L are pivotally attached, at approximately right angles, to opposite sides of the upper end-portion of rear leg 2. Front legs 3R and 3L extend forward and laterally outward, in a substantially oblique direction, to a sufficient horizontal distance to ensure apparatus stability in both fore-and-aft and lateral directions, as shown in FIGS. 1,2, 5 and 6. Two base members 4R and 4L are affixed, such as by welding, to the lower ends of two front legs 3R and 3L, as shown in FIGS. 1,2 and 10. Base members 4R and 4L extend laterally outward, along the ground, for additional lateral stability.

As illustrated in FIGS. 5 and 6, front legs 3R and 3L are pivotally attached to two pair of parallel mounting plates 5R,6R and 5L,6L, which are affixed, such as by welding, to rear leg 2. Front legs 3R and 3L are connected to mounting plates 5R,6R and 5L,6L by pivot bolts 7, which are secured in place by lock nuts 8. Plates 5R,6R and 5L,6L are attached to rear leg 2 at approximately right angles, both relative to rear leg 2 as shown in FIG. 5 and relative to each other as shown in FIG. 6. The attachment angles of mounting plates 5R,6R and 5L,6L are increased, both relative to rear leg 2 and relative to each other, when front legs 3R and 3L are, respectively, extended farther forward for additional fore-and-aft apparatus stability, and extended farther laterally outward for additional side-to-side or lateral stability. In particular, when branch arm assembly 80 is positioned higher above the ground, increased overturning loads due to wind forces must be compensated for.

As shown in FIGS. 2,5,6 and 19, a locking pin 9 is pivotally attached to the upper end-portion of each one of front legs 3R and 3L, adjacent to mounting plates 5R,6R and 5L,6L. Pins 9 are connected to legs 3R and 3L by bolts 10 and secured in place by nuts 11. And, coil springs 12 hold pins 9 out against nuts 11. As shown in FIGS 5 and 19, outer mounting plates 5R and 5L are wider than inner plates 6R and 6L, and, outer plates 5R and 5L have their upper and outer corners rectangularly notched, providing a stop for pins 9 in their locked positions. When pins 9 are in their locked positions, or running perpendicular to plates 5R,6R and 5L,6L, front legs 3R and 3L are secured or locked in their open or extended support positions, thereby, permitting the apparatus to be lifted off the ground and moved without legs 3R and 3L folding up or collapsing. Also, securing legs 3R and 3L in their open positions allows the apparatus to be tilted forward and down, pivoting on legs 3R and 3L, for the installation and removal of branch arm assembly 80. With pins 9 in their unlocked positions, front legs 3R and 3L can be easily folded up next to rear leg 2.

Horizontal Support Ties—FIGS. 1,2,9,10 and 20

As illustrated in FIGS. 1 and 2, flexible horizontal support ties 15 interconnect the lower end-portion of rear leg 2 and the lower end-portion of front legs 3R and 3L, for positioning and support. Support ties 15 prevent rear leg 2 and front legs 3R and 3L from spreading apart when weight is applied to the top of the leg support system 1.

As shown in FIGS. 9,10 and 20, eyebolts 16 are affixed, such as by welding, to the lower end-portion of rear leg 2 and front legs 3R and 3L for the attachment of ties 15. Support ties 15 loop around each eyebolt 16, and are secured in place by oval sleeves 17.

Counterweight Member—FIGS. 1,2,9 and 20

A counterweight member 13 is perpendicularly and demountably attached to the lower end of rear leg 2 in a tee configuration, as shown in FIGS. 1,2,9 and 20. Counterweight member 13 counter balances the forward weight of the fully assembled apparatus. As seen in FIGS. 9 and 20, a relatively short connection tube 14 is perpendicularly affixed, such as by welding, to counterweight member 13, in a tee manner. Connection tube 14 fits over the outside of rear leg 2, in a sleeve-like manner. A mounting tube 19 is affixed, such as by welding, to the top side of the lower end-portion of rear leg 2. A locking bolt 18 is pivotally connected to mounting tube 19 by bolt 20 and secured by a lock nut 21 . As shown in FIG. 9, locking bolt 18 secures counterweight member 13 to rear leg 2 by passing through drilled holes 22 in both connection tube 14 and rear leg 2, which allows for quick and easy attachment and removal of counterweight member 13.

Boom—FIGS. 1,2,3,5,6,11,12,13,21 and 22

Boom 30 comprises a connection tube 32, a boom tube 31, two upright mounting tubes 36, a rigid water conduit 40, and, a temporary support leg 43.

As illustrated in FIGS. 1,2,3 and 5, boom 30 is demountably attached to the upper end of rear leg 2, and extends forwardly and upwardly to a minimum height of approximately ten (10) feet above the ground. Boom 30 is in substantial alignment with the longitudinal axis of rear leg 2. That is, boom 30 generally becomes an extension of rear leg 2.

Connection Tube—FIGS. 1,2,5,7 and 8

As shown in FIGS. 5,7 and 8, a connection tube 32, which is approximately one (1) foot long, is slidably mounted inside the upper end of rear leg 2 in a sleeve-like manner, for quick and easy connection and removal.

Connection tube 32 is prevented from rotating on its longitudinal axis by means of notch 34 and pin 33 keying, as shown in FIGS. 5,7 and 8. Two U-shaped notches 34 are cut centrally, and in a substantially lateral direction, through both walls of the upper end of rear leg 2. Two holes 44 are drilled centrally, and in a substantially lateral direction, through both walls of connection tube 32, a few inches from its lower end. A pin 33 is then inserted through holes 44, and is affixed, such as by welding, to connection tube 32.

Boom Tube—FIGS. 1,2,3,5 and 11

A boom tube 31 is affixed, such as by welding, to the top side of the upper portion of connection tube 32 in an overlapping manner. Boom tube 31, which extends to the full length of boom 30, is the primary structural member of boom 30 for the support and positioning of branch arm assembly 80. Additionally, boom tube 31 serves as a supporting and protective raceway for rigid water conduit 40. Also, boom tube 31 gives conduit 40 additional insulation by shielding it from the sun.

Upright Mounting Tubes—FIGS. 3,11,12 and 13

Figure 3:
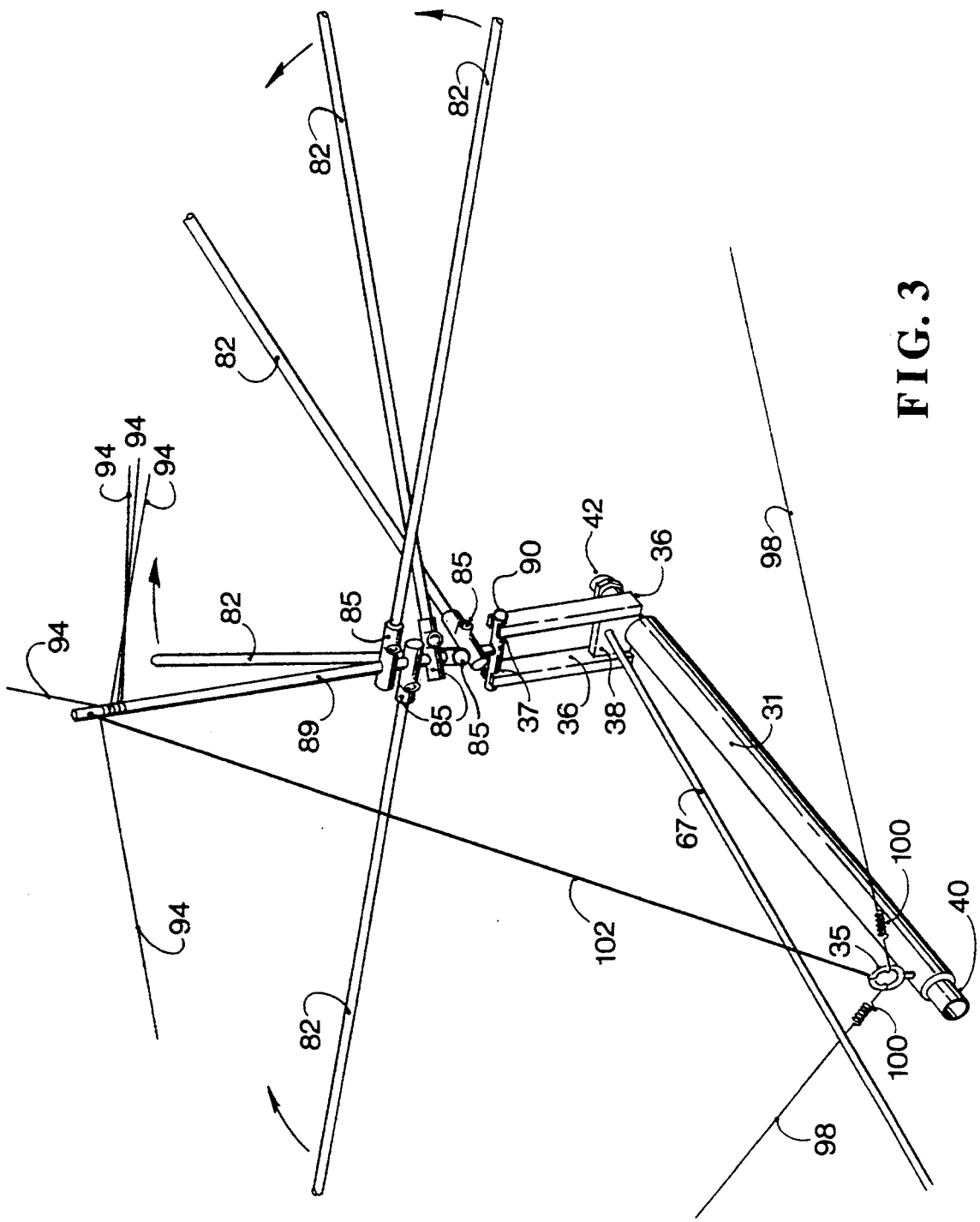
FIG. 3 is a perspective view of the upper portion of the boom, and the inner portion of the branch arm assembly.
Figure 13:
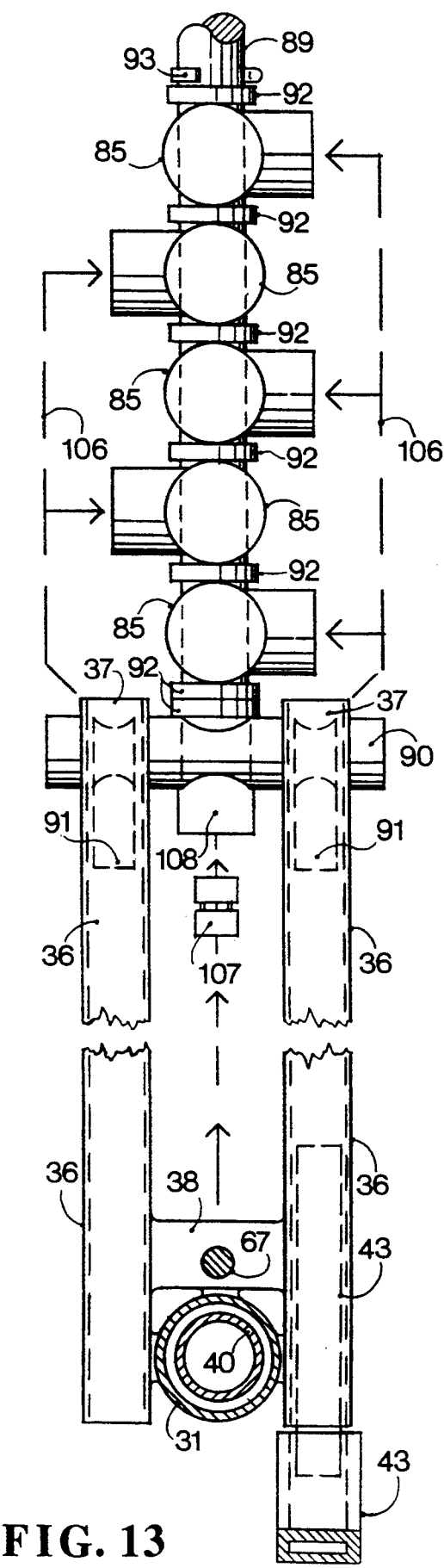
FIG. 13 is a rear elevation view of the upper end of the boom, and the lower portion of a five (5) branch arm assembly attached to the boom, with the branch arms in their closed positions.
Figure 12:
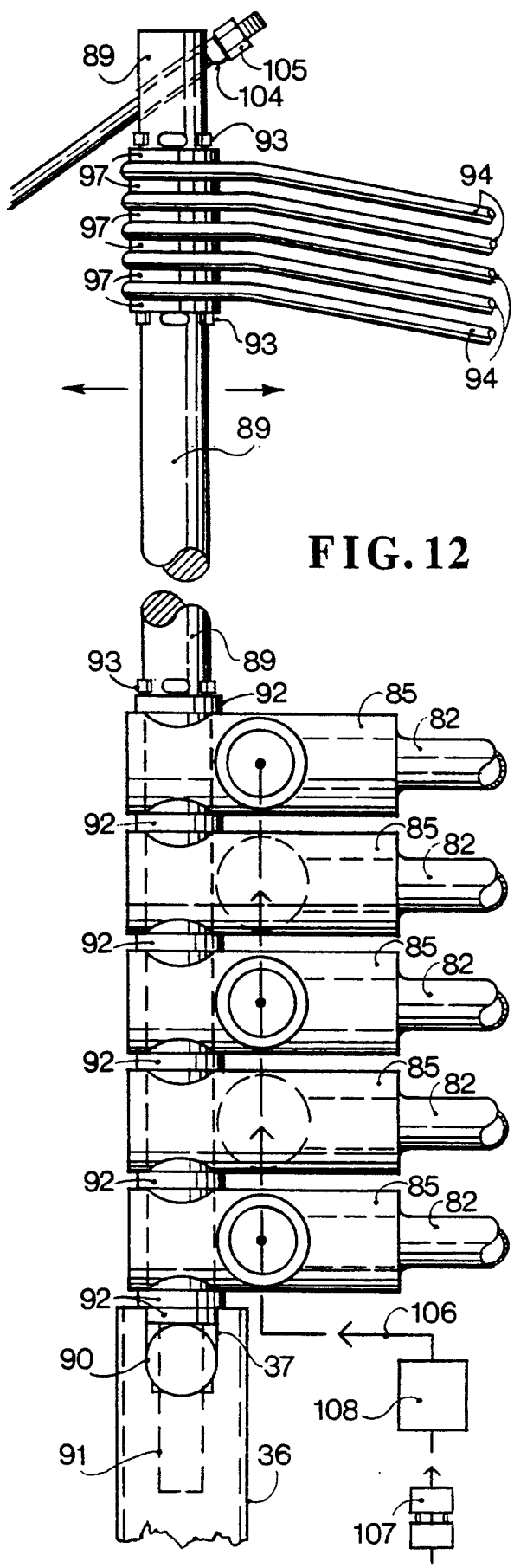
FIG. 12 is a side elevation view of the inner end-portion of a five (5) branch arm assembly, with the branch arms and support guys in their folded up or closed positions.

As illustrated in FIGS. 3,11,12 and 13, two substantially upright mounting tubes 36 are affixed, such as by welding, to the upper end of boom tube 31, with one mounting tube 36 attached to each side of boom tube 31, and extending substantially vertically upward. Tubes 36 allow the height of boom 30 to be increased without any significant increase in its length. Tubes 36, which are rectangular in shape, provide demountable attachment points at their upper extremities for branch arm assembly 80. The lateral or long sides of tubes 36 are notched down, forming U-shaped mounting saddles 37, as shown in FIGS. 12 and As shown in FIGS. 3,12 and 13, a crossmember tube 38 is laterally placed between upright mounting tubes 36 and adjacent to the top side of boom tube 31. Crossmember tube 38 is affixed, such as by welding, to both mounting tubes 36. Tube 38 serves as an attachment point for an upper truss member 67 of truss support system 60.

As shown in FIGS. 3 and 11, a connection eye 35 is affixed, such as by welding, to the top side of boom tube 31. Eye 35 is an attachment point for a flexible support stay 98 and a support tie 102, both of branch arm assembly 80.

Rigid Water Conduit—FIGS. 2,3,4A,5 and 11

As illustrated in FIGS. 2,3,4A,5 and 11, a separate rigid water conduit 40 resides interiorly of boom tube 31, and conveys water under pressure from the lower end-portion of boom 30 up to the outer end of boom 30. A lower conduit fitting 41 and an upper conduit fitting 42 are connected to, respectively, the lower end and the upper end of conduit 40. A garden hose 39 supplies water to lower conduit fitting 41. Using a separate water conduit 40 allows boom tube 31 to be structurally altered, such as a change in diameter or wall thickness, without any interference with the proper flow of water. And conversely, rigid water conduit 40 can be changed without any structural alteration to boom tube 31.

Temporary Support Leg—FIGS. 13,21,22,23 and 24

Figure 22:
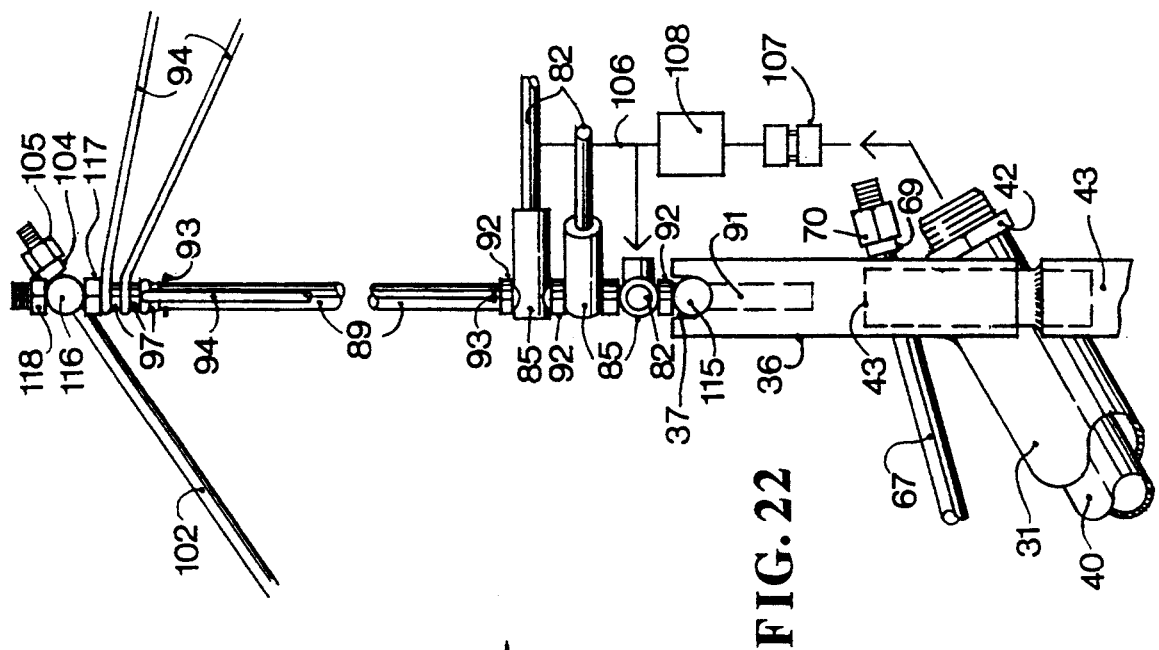
FIGS. 21 and 22 are, respectively, rear and side elevation views of a dual pivot post system.
Figure 21:
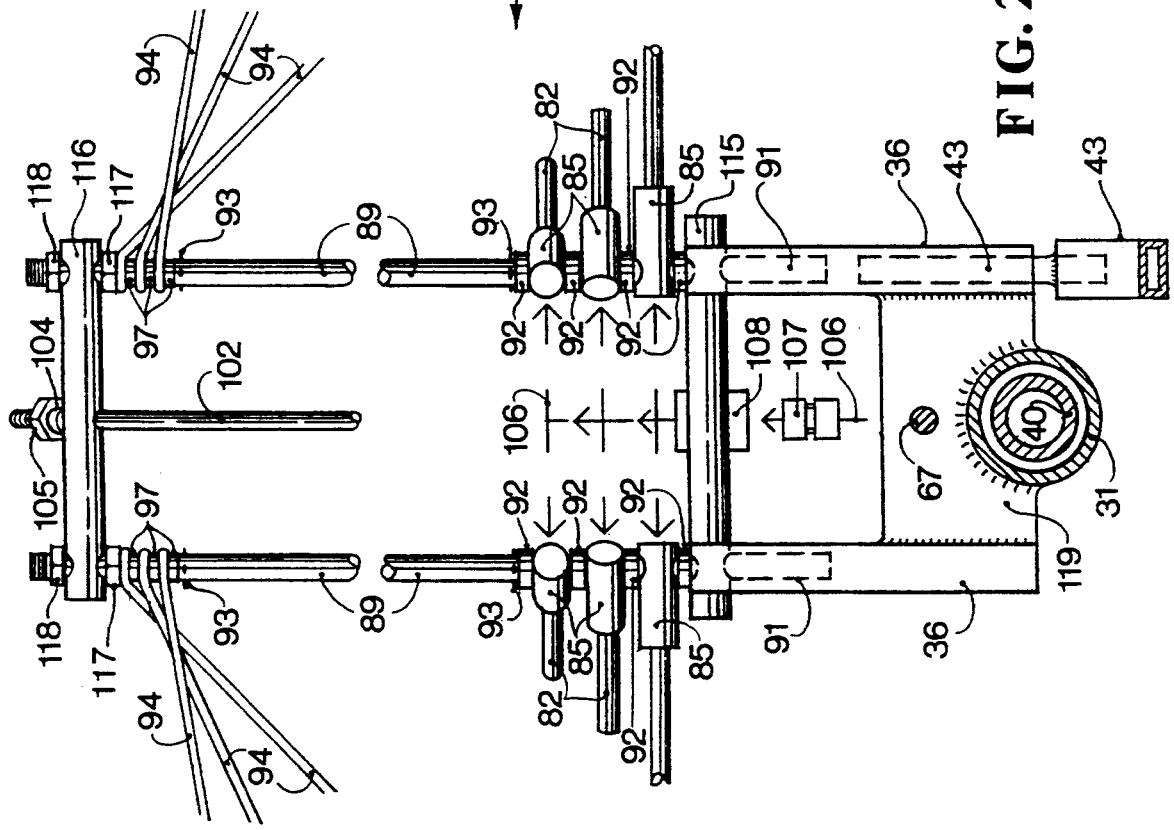
Figure 23:
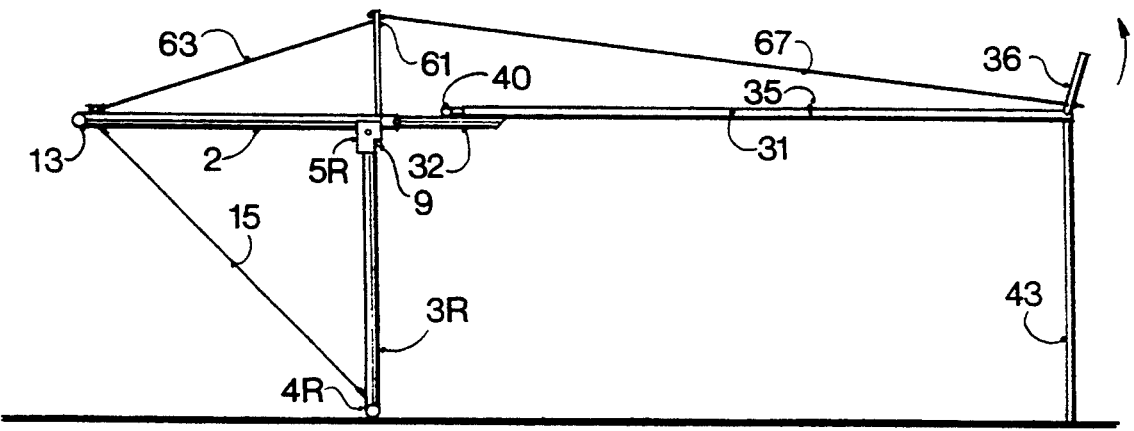
FIG. 23 is a side elevation view of the apparatus tilted forward and down, with the temporary support leg installed.

A temporary support leg 43 supports the apparatus when it is tilted forward and down for the installation and removal of branch arm assembly 80, as shown in FIG. 23. As shown in FIGS. 13,21 and 22, support leg 43 is inserted inside of the bottom end of either one of upright mounting tubes 36 of boom 30.

A Ramification of Preferred Embodiments is Described Below Movable Boom—FIGS. 24 and 25

Figure 24:
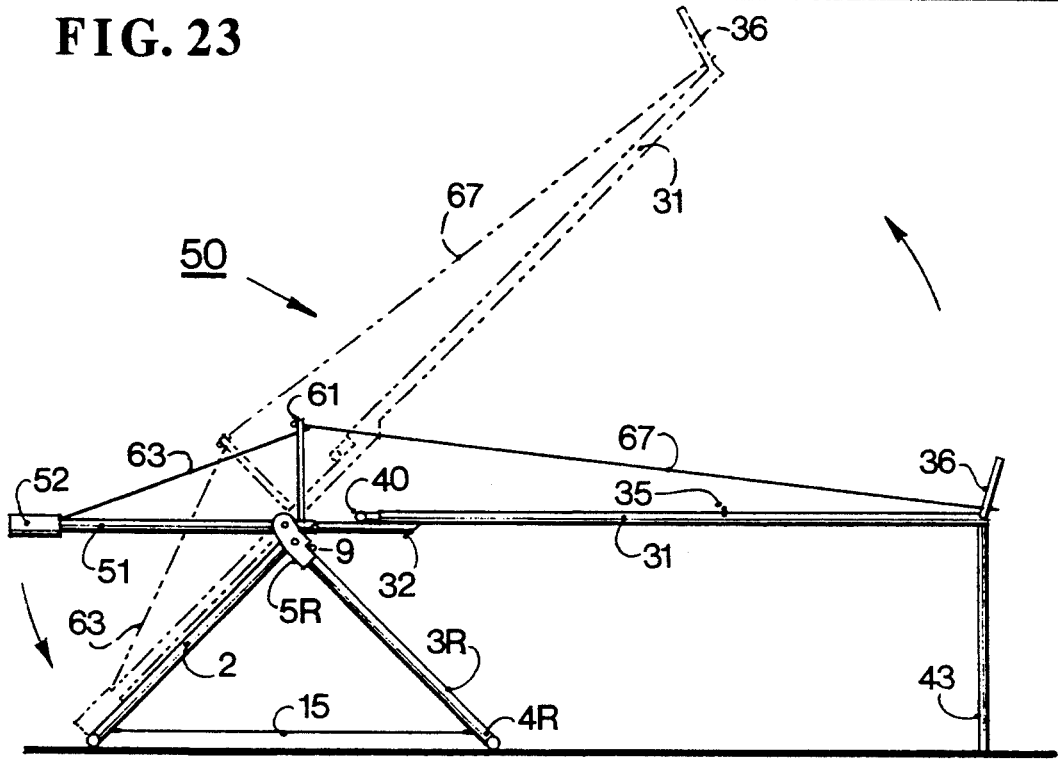
FIG. 24 is a side elevation view of a movable boom tiltted forward and down, with the temporary support leg installed. Broken lines show the boom in its operating position.
Figure 25:
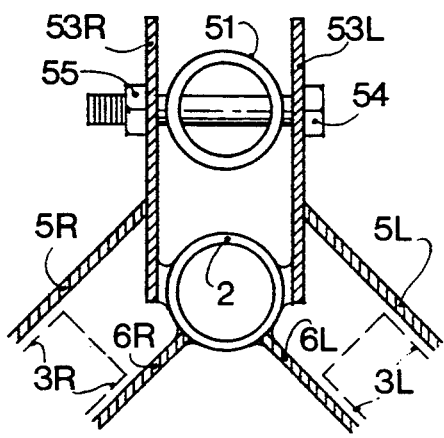
FIG. 25 is a detailed front elevation view of the movable boom connection to the leg support system.

As illustrated in FIG. 24, a movable boom 50 is pivotally attached to the top portion of leg support system 1. Boom 50 pivots up and down in a vertical plane for the installation and removal of branch arm assembly 80.

A separate balance arm 51, together with boom 30 and truss support system 60, is pivotally attached to the upper end-portion of rear leg 2. As shown in FIG. 25, two parallel mounting plates 53 are affixed, such as by welding, to the upper end-portion of rear leg 2. Balance arm 51 is connected to plates 53 by pivot bolt 54 and secured by lock nut 55.

Temporary support leg 43 supports the outer end of boom 30 during branch arm assembly 80 installation and removal as shown in FIG. 24. And, a counterweight 52 is demountably attached to the outer end of balance arm 51.

Truss Support System—FIGS. 1,2,3,5,6,9,11,13,20,21,22 and 23

Truss support system 60 comprises a truss post 61, a lower truss member 63, and, an upper truss member 67.

Truss Post—FIGS. 1,2,5,6 and 23

As illustrated in FIGS. 1,2,5,6 and 23, a truss post 61 is affixed, such as by welding, to the top side of the upper end-portion of rear leg 2. Post 61 is affixed to leg 2 at substantially right angles, and in substantial alignment with the vertical plane along the longitudinal axis of rear leg 2. Post 61, which is constructed of rectangular tubing, has its fore-and-aft sides of its outer end notched down in a U-shaped manner, forming a forked outer end 62. Forked end 62 provides for quick and easy connection and removal of upper truss member 67, as shown in FIGS. 5 and 6.

Lower Truss Member—FIGS. 1,2,5,6,9,19,20,23 and 24

As shown in FIGS. 1,2,23 and 24, a lower truss member 63 interconnects the lower end-portion of rear leg 2 and the outer end-portion of truss post 61, forming a lower substantially right triangular support.

As illustrated in FIGS. 9 and 20, the lower end of lower truss member 63 is attached to mounting tube 19, and is secured in place by a locking bar 64, which is affixed, such as by welding, to truss member 63. And, as illustrated in FIGS. 2,5,6 and 19, the upper end of lower truss member 63 is adjustably attached to the outer end-portion of truss post 61, and is secured in place by a lock nut washer 65 and a lock nut 66.

Upper Truss Member—FIGS. 1,2,3,5,6,11,19,23 and 24

As shown in FIGS. 1,2,3,23 and 24, an upper truss member 67 interconnects the outer or forward end of boom 30 and the forked outer end 62 of truss post 61, forming an upper substantially right triangular support.

As shown in FIGS. 3,11 and 13, the upper end of upper truss member 67 is adjustably attached to cross-member tube 38 of boom 30, and is secured in place by a lock nut washer 69 and a lock nut 70. As shown in FIGS. 2,5 and 6, the lower end of upper truss member 67 is demountably attached to forked outer end 62 of truss post 61, and is secured in place by a locking bar 68, which is affixed, such as by welding, to truss member 67.

Truss support system 60, wherein rear leg 2 serves as a balance arm, provides for a strong and relatively lightweight supporting and positioning boom 30.

Leg support system 1 and the attached lower portion (truss post 61 and lower truss member 63) of truss support system 60, with counterweight member 13 removed from rear leg 2 and front legs 3R and 3L in their folded up or retracted positions, provide for a relatively small and lightweight longitudinal bundle for easy carrying and stowing.

The demountable attachment of upper truss member 67 to truss post 61 provides for quick and easy connection and removal of both the upper portion (upper truss member 67) of truss support system 60 and boom 30; whereby, boom 30 and upper truss member 67 can be easily collected up into a relatively small and lightweight longitudinal bundle for easy transporting and stowing.

A Ramification of Preferred Embodiments is Described Below —Dual Truss Post System—FIG. 19

A dual truss post system 71 is illustrated in FIG. 19. A secondary truss post 72 is affixed, such as by welding, to the top side of connection tube 32 and as close as possible to rear leg 2. Also, secondary post 72 is attached at substantially right angles to connection tube 32 and in substantial alignment with truss post 61. Upper truss member 67 is attached to the outer end-portion of secondary post 72.

A truss support link 73 interconnects the outer end of secondary post 72 and forked outer end 62 of truss post 61. Secondary post 72, which is constructed of rectangular tubing, has its lower fore-and-aft side notched down in a U-shaped manner for support link 73 clearance. Link 73 is pivotally connected to secondary post 72 by a pivot pin 74 and secured in place by a cotter pin 75. Link 73 is demountably connected to forked end 62 and secured by locking bar 76, which is affixed, such as by welding, to link 73.

Secondary truss post 72 and truss support link 73 provide a convenient mounting place for upper truss member 67 when boom 30 and the upper portion (truss link 73, secondary post 72, and upper truss member 67) of truss support system 60 are disengaged for transporting and stowing.

Branch Arm Assembly—FIGS. 1,3,4A,4B,12,13,14A,14B,15,16,17,18,21,22 and 26

As illustrated in FIGS. 1,3,12,13,21 and 22, an overhead branch arm assembly 80 is demountably and pivotally attached to the upper extremity of boom 30.

Branch arm assembly 80 comprises at least one pivot post 89, branch arms 81, nozzles 88, attachment tubes 86, support guys 94, a flexible support stay 98, a support tie 102, and flexible water conduit 106.

Pivot Post—FIGS. 1,3,12,13,21 and 22

As illustrated in FIGS. 1,3,12,13,21 and 22, at least one substantially upright pivot post 89, which is the hub of branch arm assembly 80, is indirectly attached to upright mounting tubes 36 of boom 30. Whether a single pivot post 89 is employed, as shown in FIGS. 1,3,12 and 13 or whether two or more pivot posts 89 are used, as shown in FIGS. 21 and 22, depends on the number of branch arms 81 used in the assembly 80. Branch arms 81 and support guys 94 are pivotally attached to at least one post 89 in a stacking manner, as shown in FIGS. 3,12,21 and 22. Where four (4) or five (5) branch arms 81 are used, as shown in FIGS. 1,3,4A and 4B, a single post 89 is used. Where six (6) or more arms 81 are used, as shown in FIGS. 21 and 22, two (2) or more posts 89 are used for two reasons: The first reason for using multiple pivot posts 89 is to reduce the possibility of entanglement or even damage to branch arm assembly 80 due to increased stacking of branch arms 81 and their support guys 94, especially when assembly 80 is being folded up. The second reason for using multiple posts 89 is to lower the center of gravity of assembly 80 by decreasing the stacking height of both branch arms 81 and support guys 94, thereby increasing the stability of branch arm assembly 80.

When a single pivot post 89 is used, as shown in FIGS. 12 and 13, a horizontal and lateral mounting bar 90 is affixed, such as by welding, to the lower end-portion of post 89 in a tee manner. Two (2) upright mounting pins 91 are then affixed, such as by welding, to mounting bar 90. Pins 91, which are affixed to bar 90 an equal distance on each side of post 89, extend downward from bar 90 in alignment with upright mounting tubes 36 of boom 30. Pins 91 fit down inside mounting tubes 36 for lateral positioning of pivot post 89, together with the remainder of branch arm assembly 80.

The lateral or long sides of the rectangularly shaped upright mounting tubes 36 of boom 30 are notched down, forming relatively deep U-shaped mounting saddles 37 for the placement of the round shaped mounting bar 90, as illustrated in FIGS. 12 and 13. Mounting saddles 37 provide pivot post 89, together with the remainder of branch arm assembly 80, with fore-and-aft positioning and a means for pivoting in the fore-and-aft vertical plane.

The mounting pin 91 and mounting saddle 37 method of pivot post 89 attachment to boom 30 provides for very easy installation and removal of branch arm assembly 80.

A dual pivot post system 114, as shown in FIGS. 21 and 22, has six (6) branch arms 81 pivotally attached to two (2) pivot posts 89, with three (3) arms 81 attached to each post 89. Pivot posts 89 in a dual post system 114 have a smaller diameter, and fit directly down inside of upright mounting tubes 36 of boom 30 for lateral positioning.

A lower tie member 115 and an upper tie member 116 interconnect, respectively, the lower and upper portion of pivot posts 89. The upper end-portion of posts 89 are threaded. Jam nuts 117 are placed between support guy 94 columns and upper tie member 116. And, lock nuts 118 secure upper tie member 116 in place. Lower tie member 115 is affixed, such as by welding, to pivot posts 89. Cotter pins 93 are placed below support guy 94 column and above branch arm 81 column to secure both columns in place, as shown in FIGS. 21 and 22.

A support tie 102 is adjustably attached to the center of upper tie member 116, and is secured by a washer 104 and a lock nut 105.

A crossmember 119 is affixed, such as by welding, to the outer end of boom tube 31. Upright mounting tubes 36 are affixed, such as by welding, to the lateral ends of crossmember 119.

Branch Arms—FIGS. 1,3,4A,4B,12,13,14A,14B,15,16,21 and 22

As illustrated in FIGS. 1,3,4A,4B,12,13,21 and 22, a plurality of branch arms 81 are pivotally attached to the lower portion of at least one pivot post 89. Branch arms 81 extend radially outward, forming a substantially semi-circle pattern, as shown in FIGS. 1, 3, 4A and 4B.

Branch arms 81 are a so-called "wet" system, wherein each arm 81 supports and positions spraying nozzles 88, and serves as a rigid conduit for delivering water under pressure to each nozzle 88.

As shown in FIGS. 3,12,21 and 22, branch arms 81 are attached to at least one pivot post 89 with each arm 81 being placed on top of the other, in a stacking manner. Disc-like spacers 92 are placed between each arm 81 to provide sufficient vertical separation for the prevention of entanglement and possible damage to arms 81, especially when arms 81 are being folded up. Cotter pin 93 is placed above and adjacent to branch arm 81 and spacer 92 column assembly for vertical positioning, as shown in FIGS. 12,13,21 and 22.

Figure 4A:
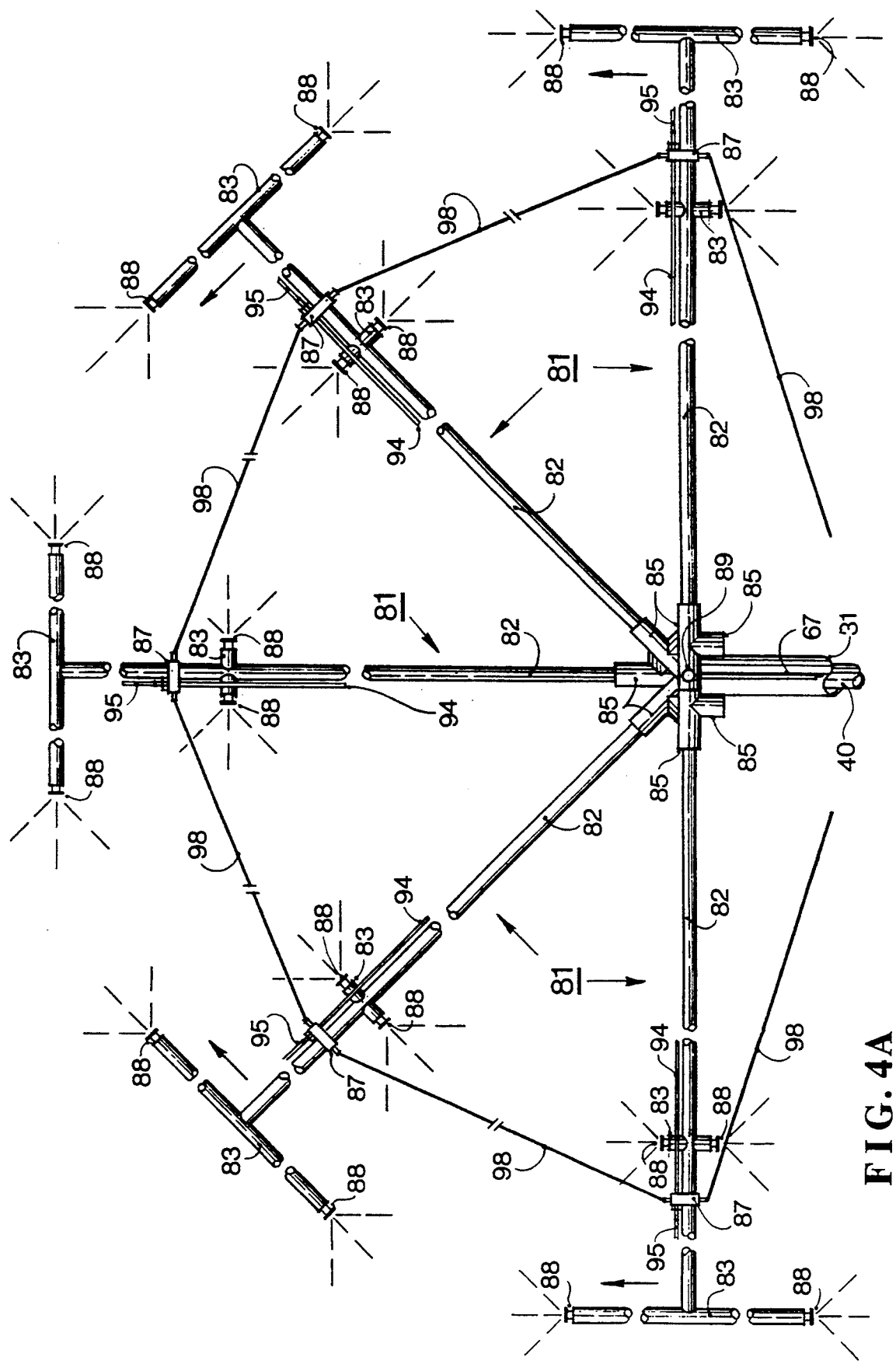
FIGS. 4A and 4B are plan views of, respectively, a five (5) branch arm assembly and a four (4) branch arm assembly.

A connection fitting 85, as shown in FIGS. 12,13 and 16, attaches each branch arm 81 to at least one pivot post 89. Fitting 85 has a threaded female inlet on its side for the connection of flexible water conduit 106. Branch arm tubing 82, as shown in FIGS. 3,4A,12 and 16, is attached, such as by welding, to the outer end of fitting 85, and extends outwardly to nearly the full length of branch arm 81. Branch arm tubing 82 is the primary structural member in each branch arm 81, as well as being the conduit for delivering water to sub-branch arms 83 and diagonal sub-branch arms 84, as shown in FIGS. 4A,14A and 14B.

Sub-branch arms 83 and diagonal sub-branch arms 84, as shown in FIGS. 4A,4B,14A and 14B, are affixed, such as by welding, at appropriate positions along branch arm tubing 82, and, at the outer end of branch arm tubing 82 of each branch arm 81. Arms 83 and diagonal arms 84 support and position, as well as deliver water to, individual nozzles 88.

FIG. 4A shows a five (5) branch arm assembly 80 with sub-branch arms 83 attached to branch arm tubing 82 at substantially right angles. Arms 83 are attached to the outer end of tubing 82 in a tee manner, and extend outward in both directions for approximately twelve (12) inches. Arms 83 attached to the approximate midway portion of tubing 82, extend laterally in both directions for a couple of inches. These sub-branch arm 83 lengths are based on branch arms 81 of approximately twelve (12) feet in length.

Where a larger spray pattern area is desired, requiring longer branch arms 81, the length of sub-branch arms 83 are changed accordingly. Also, additional arms 83 are attached along branch arm tubing 82, where appropriate, for sufficient spray pattern coverage.

Figure 4B:
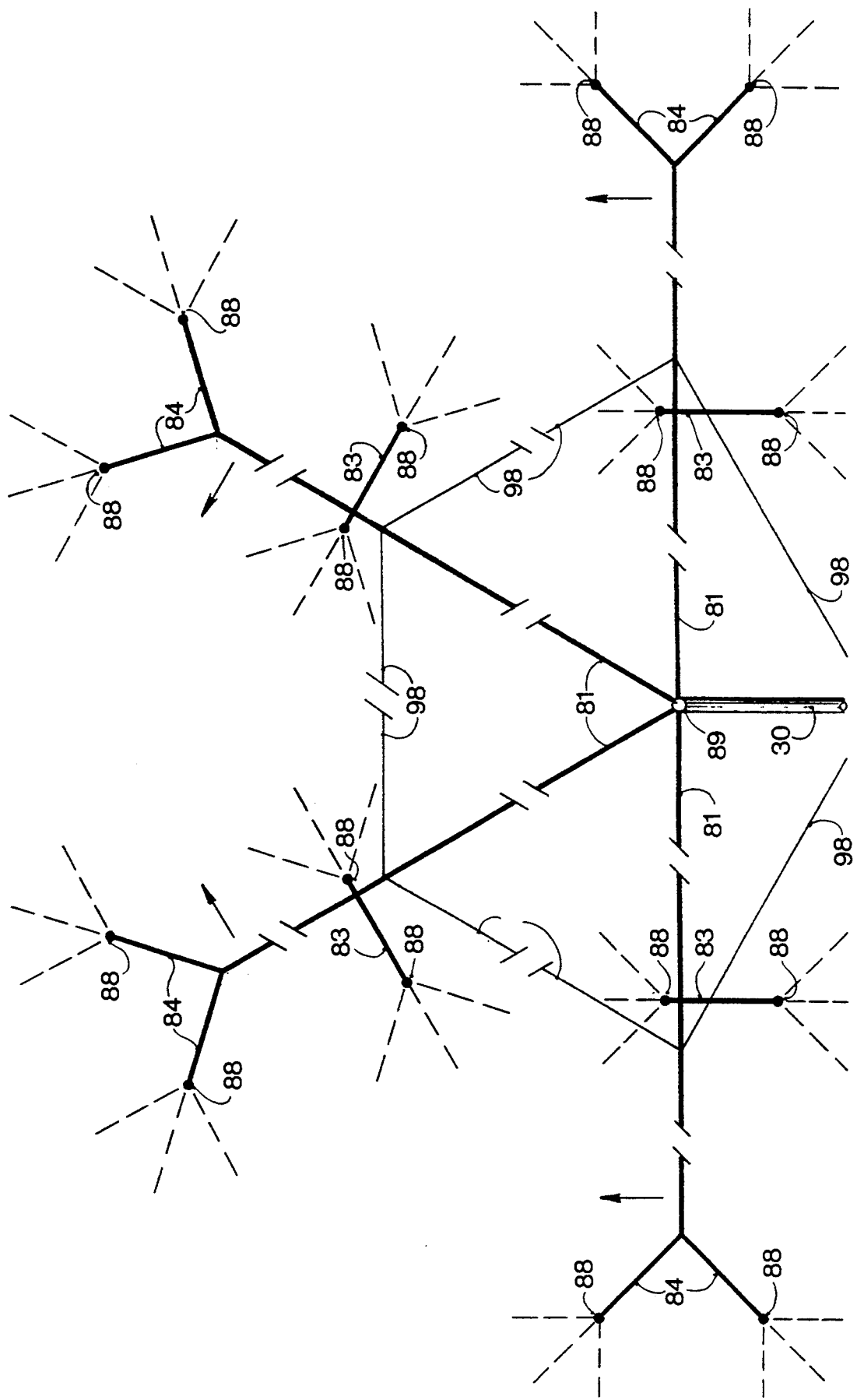

FIG. 4B shows a four (4) branch arm assembly 80 with relatively long diagonal sub-branch arms 84. Diagonal arms 84 are attached, in a diagonal or oblique direction, to the outer end of, and at appropriate positions along each branch arm tube 82.

A four (4) branch arm assembly 80 with relatively long diagonal sub-branch arms 84 provides substantially the same spray pattern coverage as a five (5) branch arm assembly 80 with much shorter sub-branch arms 83. The use of a four (4) branch arm assembly 80, with diagonal sub-branch arms 84, allows for a reduction in both weight and cost in assembly 80 construction. However, the use of a five (5) branch arm assembly 80, with shorter sub-branch arms 83, provides for a narrower longitudinal bundle when assembly 80 is folded up and disengaged for carrying and stowing.

Nozzles—FIGS. 1,4A,4B, 14A and 14B

Nozzles 88 are attached to the outer ends of sub-branch arms 83 or diagonal sub-branch arms 84, as shown in FIGS. 1,4A and 4B. Female threads are provided for easy installation and removal of nozzles 88, as shown in FIGS. 14A and 14B.

Nozzles 88 are made of brass and produce a highly atomized hollow cone spray. Nozzles 88 can operate with water pressure as low as twenty-five (25) p.s.i., with higher water pressures producing a finer spray over a larger spray pattern area. Each nozzle 88 has a built-in removable eighty (80) mesh monel screen strainer for easy cleaning. Nozzles 88 are available in a variety of sizes ranging from 0.63 G.P.H. (gallons per hour) foggers to 9.2 G.P.H. fine mist, with water pressure at 40 p.s.i.. Nozzles 88 are manufactured by Monarch Manufacturing Works, Inc., Philadelphia, Pa.

Attachment Tubes—FIGS. 14A,14B,15,18 and 26

As illustrated in FIGS. 14A,14B and 15, substantially upright attachment tubes 86, with at least one attachment tube 86 attached to each branch arm 81, are affixed, such as by welding, to branch arm tubing 82 at approximately a two-thirds distance out from pivot post 89. The first purpose of attachment tubes 86 is to serve as attachment points for support guys 94 and a flexible support stay 98. Tubes 86 extent upward to approximately ½ inch above branch arm tubing 82 for the longitudinal connection of support guys 94, and extend downward to approximately ½ inch below branch arm tubing 82 for the lateral connection of a flexible support stay 98.

Figure 26:
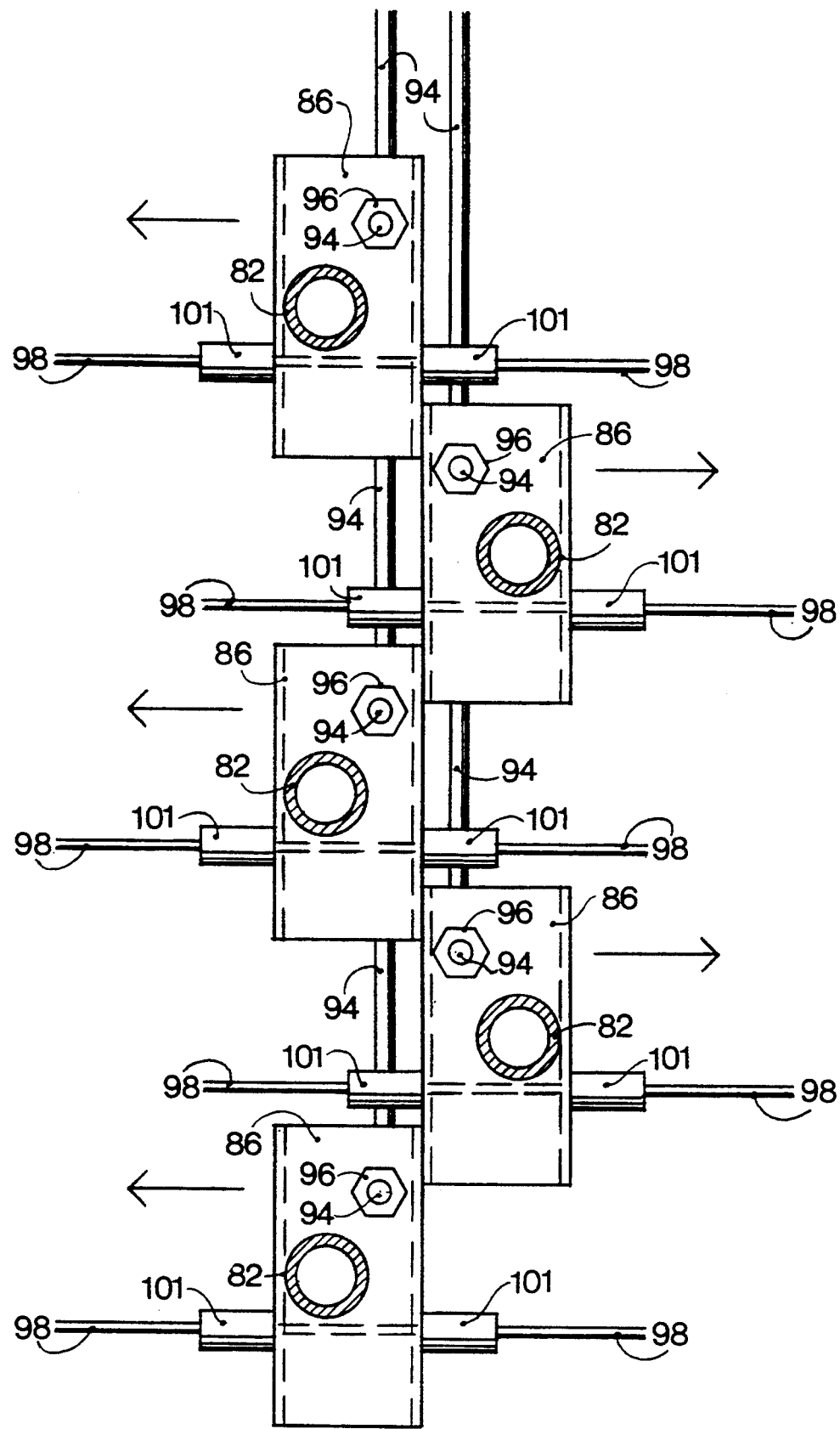
FIG. 26 shows a slightly enlarged front elevation view of five (5) branch arms in their folded up or closed positions.

The second purpose of attachment tubes 86 is to prevent branch arms 81 from being completely folded up, forcing branch arms 81 to be placed on top of each other in an offsetting or staggered manner. The staggered manner in which branch arms 81 are positioned eliminates the possibility of entanglement and damage to both branch arms 81 and support guys 94, as illustrated in FIG. 26. When arms 81 are being folded up, the upper portion of one attachment tube 86 comes into contact with the lower portion of another attachment tube 86, which is affixed to branch arm 81 immediately above, as shown in FIG. 26. Also, attachment tubes 86 are affixed to branch arm tubing 82 in a lateral offsetting manner, with tubing 82 being positioned in the outer portion of attachment tubes 86. Support guys 94 are adjustably attached, in a lateral offsetting manner, to the inner portion of attachment tubes 86, thereby providing sufficient horizontal separation between branch arm tubing 82 and support guys 94 when branch arms 81 are collapsed or folded up, as shown in FIGS. 14B,15 and 26.

Support Guys—FIGS. 1,3,4A,12,14A,14B,15,17,18,21,22 and 26

A plurality of support guys 94, with at least one support guy 94 supporting each branch arm 81, are pivotally attached to the upper portion of at least one pivot post 89, and, extend radially outward and downward, adjustably attaching to the upper portion of attachment tubes 86, as shown in FIGS. 1,3,4A,12 and 14A.

As stated above, support guys 94 are fastened, in an off-center or offsetting manner, to the inner portion of attachment tubes 86, as shown in FIGS. 14B,15 and 26. Guys 94 are secured in place by a lock nut 96, as shown in the drawings. And, as also stated above, branch arm tubing 82 is affixed, in a laterally off-center manner, to the opposite outer portion of attachment tubes 86, providing sufficient horizontal separation between tubing 82 and guys 94 when branch arm assembly 80 is collapsed or folded up, as shown in FIG. 26.

Support guys 94 are pivotally attached to pivot post 89 by looping around post 89 and being affixed, such as by welding, to the incoming portion of guys 94, as shown in FIG. 17. Sufficient clearance between guys 94 and post 89 is maintained to prevent excessive wear to guys 94.

As illustrated in FIGS. 12,21 and 22, support guys 94 are connected to pivot post 89 with each guy 94 being placed on top of the other, in a stacking manner. Disc-like spacers 97 are placed between each guy 94 to provide sufficient vertical separation for the prevention of possible entanglement or even damage to guys 94, particularly when branch arms 81 are being folded up. Cotter pins 93 are placed above and below, and adjacent to, support guy 94 and spacer 97 column assembly for vertical positioning, as shown in FIG. 12.

At least one secondary support guy 95, as shown in FIG. 18, is attached to the outer portion of each branch arm 81, in a trusslike manner, for additional support when arms 81 are over approximately ten (10) feet in length. Also, secondary guys 95 are employed with branch arms 81 approximately ten (10) feet and under in length when relatively longer and heavier diagonal sub-branch arms 84 are used.

Extended attachment tubes 87, as shown in FIG. 18, are affixed, by welding, to branch arm tubing 82 in the same off-center manner as attachment tubes 86. Secondary support guys 95 are adjustably fastened to the top portion of extended attachment tubes 87 in an off-center manner, and extend outward and downward along the inside of branch arm tubing 82, and affixed, such as by welding, to the underside of tubing 82. Extended tubes 87 are sufficiently rigid enough to resist undue bending when secondary guy 95 tension loads are applied. Secondary guys 95 are adjustably secured to extended tubes 87 by a lock nut 96.

When secondary support guys 95, together with their extended attachment tubes 87 are employed, vertical separation between branch arms 81 must be increased accordingly to allow sufficient clearances for the laterally attached flexible support stay 98 to pass between the folded up branch arms 81. The thickness of branch arm spacers 92, as shown in FIG. 12, is increased by an amount equal to the increased length of extended attachment tubes 87.

When branch arms 81 are approximately fifteen (15) feet or more in length, two (2) or more support guys 94 are employed for each branch arm 81. Additional support guys 94 are used in conjunction with secondary support guys 95, and are attached to both pivot post 89 and branch arms 81, with additional attachment tubes 86 or extended attachment tubes 87, in the same manner as in a single support guy 94 branch arm assembly 80.

Flexible Support Stay—FIGS. 1,3,4A,4B,14A,14B,15,18,11 and 26

As shown in FIGS. 1,3,4A and 4B, a substantially horizontal flexible support stay 98 interconnects each branch arm 81 and a connection eye 35, which is affixed to boom 30, for branch arm 81 radial positioning and support.

As shown in FIGS. 14A,14B,15,18 and 26, support stay 98 is laterally attached to the lower portion of attachment tubes 86 or extended attachment tubes 87. Stay 98 passes through both walls of tubes 86 or extended tubes 87, and is placed as close as possible to the underside of branch arm tubing 82 to reduce torsional loading on branch arms 81. Stop sleeves 101 are placed on each side of each tube 86 or extended tube 87 to secure arms 81 to stay 98.

A pair of tension springs 100, as shown in FIG. 3, are fitted to stay 98, close to each end, to absorb jerking or impact loads imposed on stay 98 when branch arms 81 are moved back-and-forth due to support apparatus handling and wind forces acting on branch arm assembly 80. A hook 99, as shown in FIG. 11, is attached to each end of stay 98 for easy connection and removal from connection eye 35, of boom 30.

One additional flexible support stay 98 is provided for each set of additional support guys 94, and are connected to the additional attachment tubes 86 or extended attachment tubes 87 and connection eye 35 in the same manner as in a single support stay 98 system.

Support Tie—FIGS. 1,3,11,12,21 and 22

A flexible support tie 102 interconnects connection eye 35 of boom 30, as shown in FIGS. 1,3 and 11, and the top portion of one pivot post 89 or the center of upper tie member 116 of two or more pivot posts 89, as shown in FIGS. 3,12,21 and 22.

The primary purpose of support tie 102 is to support the forward extending support guys 94, which are carrying or supporting the forward overhang loads or weight of branch arm assembly 80. The loads of laterally extended guys 94 offset each other, and no additional support is necessary, as shown in FIGS. 1,3,21 and 22.

The second purpose of support tie 102 is to adjust the attachment angle of branch arm assembly 80. Assembly 80, pivoting in the fore-and-aft vertical plane, is positioned by an adjustably attached washer 104 and a lock nut 105 at the threaded upper end of tie 102, as shown in FIGS. 12, 21 and 22.

A hook 103 is attached to the lower end of support tie 102 for easy connection and removal from connection eye 35.

Flexible Water Conduit—FIGS. 12,13,21 and 22

As illustrated schematically in FIGS. 12,13,21 and 22, flexible water conduit 106 delivers water under pressure from the upper end of rigid water conduit 40 of boom 30 to the individual branch arms 81. A quick-disconnect coupling 107 is provided for quick and easy disengagement. An in-line filter 108 is provided between coupling 107 and branch arms 81, or "downstream" to prevent sand and other debris from entering arms 81 and clogging nozzles 88.

MATERIALS

Leg Support System 1 and Boom 30

Leg support system 1 and the structural portion of boom 30 are constructed of either mild steel or alloy aluminum. Mild steel is tougher, less expensive, and easier to weld than aluminum. Allow aluminum is lighter weight and has much better corrosion resistance than steel. If aluminum is used, it must be a relatively strong and easily weldable allow, with good corrosion resistance, such as 6061-T6. If mild steel is used, special care must be taken for corrosion protection, particularly with the interior of tubular material. In some cases, the ends of tubes can be capped off with either plugs or welded plates. With other tubes, the interior must have a protective coating, such as zinc plating.

The exterior portion of most parts in leg support system 1 and boom 30, as well as the remainder of the portable support apparatus, are powder coated with appropriate material for corrosion resistance, as well as for aesthetics.

Horizontal Support Ties 15

Horizontal support ties 15 employed in leg support system 1 are constructed of aircraft quality hot galvanized steel cable. The cable is a minimum of ⅛ inch diameter, and is vinyl coated for greater abrasion and weathering resistance.

Rigid Water Conduit 40

Rigid water conduit 40, together with lower 41 and upper 42 conduit fittings, is constructed of either alloy aluminum or P.V.C. (polyvinyl-chloride). If aluminum is used, it must be an easily weldable alloy, with good corrosion resistance, such as 6061 or 6063. If P.V.C. is used, it must be ultra-violet resistant (U.V.R.) for sunlight protection, and it must be relatively thick-walled schedule 40.

The U.V.R. fittings are available from Spears Manufacturing Co., in Sylmar, California. The U.V.R. piping or conduit is available from North Coat & Associates, under the trade name SUNSTOP, in San Clemente, Calif.

Lower 63 and Upper 67 Truss Members

Lower 63 and upper 67 truss members are constructed of either alloy aluminum rod or aircraft quality hot galvanized steel cable. If aluminum rod is used, it must be a minimum of ¼ inch in diameter. Aluminum rod must be a good strength and an easily weldable alloy with good corrosion resistance, such as 6061-T6. If steel cable is used, it must be a minimum of 5/32 inch in diameter, and be vinyl coated for greater abrasion and weathering resistance.

Support Guys 94 and Secondary Support Guys 95

Support guys 94 and secondary support guys 95 are constructed of either alloy aluminum rod or aircraft quality hot galvanized steel cable. If aluminum rod is used, it should be at least ⅛ inch in diameter. Rod should also be a good strength and an easily weldable allow, with good corrosion resistance, such as 6061-T6. If steel cable is used, it should be a minimum of 1/16 inch in diameter, and be vinyl coated for greater abrasion and weathering resistance.

Pivot Posts 89

Pivot posts 89 are constructed of 6061-T6 alloy aluminum round bar or thick-wall tubing. Posts 89 range in size from approximately ¾ inch O.D. down to approximately ⅜ inch O.D., with the exact diameters depending on the number and lengths of branch arms 81 and support guys 94 attached to each post 89. Also, the height of pivot posts 89 depends on the number and lengths of arms 81 and guys 94 attached to each post 89.

Branch Arms 81

Connection fittings 85 are constructed of either alloy aluminum or P.V.C. (polyvinyl-chloride). Aluminum is stronger than P.V.C.. P.V.C. is less expensive than aluminum, and is more readily available in standard sizes, with less machine work to be done. If P.V.C. is used, it must be U.V.R. (ultra-violet resistant) for sunlight protection. If alloy aluminum is used, it should be 6061-T6.

Branch arm tubing 82, together with affixed attachment tubes 86 or extended attachment tubes 87 and sub-branch arms 83 or diagonal sub-branch arms 84, are constructed of either alloy aluminum or copper. Alloy aluminum is lighter and stronger than copper. Copper is less expensive and easier to fabricate than aluminum.

Branch arms 81 are built in sections, with branch arm tubing 82 diameters being reduced, in a telescoping manner, as tubing 82 progresses outward from pivot post 89. Tubing 82 ranges in size from approximately ½ inch O.D. down to approximately 5/16 O.D., with wall thicknesses in the 0.049" range.

Flexible Support Stay 98

Flexible support stay 98 is constructed of aircraft quality hot galvanized steel cable of at least 1/16 inch diameter.

Support Tie 102

Flexible support tie 102 is constructed of aircraft quality hot galvanized steel cable of at least 3/32 inch diameter.

Flexible Water Conduit 106

Flexible water conduit 106 is constructed of an inner liner of either synthetic rubber or a plastic, such as polypropylene. An outer covering, such as braided steel, is placed over the inner liner, providing for additional protection from abrasion and ultraviolet rays from the sun. Fittings used in conduit 106 are either anadized aluminum or plastic. If plastic is used, it must be ultraviolet resistant for sunlight protection.

SUMMARY AND SCOPE

Accordingly, the reader can see that the portable support apparatus for evaporative cooling of my invention provides a spray pattern area of several hundred square feet with overhead fine mist spray, without any significant apparatus intrusion into or interference with target area to be cooled. Furthermore, the portable support apparatus has the additional advantages in that It provides a support apparatus which can be easily lifted off the ground and moved a relatively short distance when fully assembled.

It provides a support apparatus which can be quickly and easily disassembled, or broken down, into smaller and relatively lightweight sections for easy carrying and stowing.

Although the description above contains many specificities, these should not be construed as limiting the scope of the invention, but as merely providing illustrations of some of the presently preferred embodiments of this invention. For example, the support apparatus can be constructed of materials other than mild steel, alloy aluminum, P.V.C., and copper, such as glass fiber, carbon fiber, as well as other plastics and metals. In another example, the branch arm assembly can be a so-called "dry" system, wherein each branch arm supports and positions separate flexible water conduit with mist spraying nozzles attached.

Thus the scope of my invention should be determined by the appended claims and their legal equivalents, rather than by the examples given.

I claim:

1. A lightweight, portable support apparatus for pressurized water conveyance and mist spraying nozzles for overhead evaporative cooling purposes, said apparatus comprising, (a) a single rear elongated leg extending outwardly and rearwardly along a longitudinal center line axis of said apparatus, two front elongated legs of equal length being oppositely attached to an upper end-portion of said rear elongated leg, such that each of said front elongated legs extends forwardly and laterally outward from said longitudinal center line axis of the apparatus in a substantially oblique direction, substantially horizontal support ties interconnecting a lower end-portion of all three legs for positioning and support;

(b) a boom attached to the upper end-portion of said rear elongated leg and extending forwardly and upwardly in substantial alignment with the longitudinal axis of the rear leg, said boom having conduit means for conveying water under pressure;

(c) a truss post affixed at substantially right angles to a top side of the upper end-portion of the rear leg, a lower truss member interconnecting the lower end-portion of the rear leg and an outer end-portion of said truss post, an upper truss member interconnecting said outer end-portion of the truss post and an outer end-portion of the boom;

(d) at least one substantially upright pivot post attached to the outer end-portion of the boom, a plurality of branch arms, pivot means for pivotally attaching an inner end-portion of each of said branch arms to a lower portion of said at least one pivot post, said branch arms extending radially outward from said pivot means, the branch arms having conduit means for conveying water under pressure, at least one mist spraying nozzle attached to each branch arm, a plurality of support guys, each one of said support guys having pivot means for pivotally attaching to an upper portion of said at least one pivot post, at least one of said plurality of support guys extending radially outwardly and downwardly from said upper portion of said at least one pivot post and attaching to at least one of said branch arms, each support guy having adjustable means for lengthwise adjustment, at least one flexible support stay interconnecting each branch arm and the boom for radial positioning and support, said flexible support stay having two ends and each end having quick-release means for easy removal from the boom, a flexible water conduit interconnecting said conduit means of the boom and said conduit means of each branch arm, said flexible water conduit having a quick-disconnect coupling, a filtering means for filtering water between said quick-disconnect coupling and said at least one mist spraying nozzle, a support tie interconnecting the upper portion of said at least one pivot post and a lower and substantially central point of the apparatus; and (e) a counter-balance means for counter-balancing the forward weight of the apparatus being provided at the lower end-portion of the rear leg.

2. The support apparatus of claim 1, including pivot means for pivotally attaching each of said front elongated legs to said rear elongated leg wherein the front legs can be moved from their extended support positions to folded-up positions, lying substantially adjacent to the rear leg in a generally longitudinal bundle; and, said horizontal support ties having collapsible means for collapsing when the two front legs are folded into the rear leg.

3. The support apparatus of claim 2, including demountable means for causing said boom to be demountably attached to said upper end-portion of said rear elongated leg, a keying means for preventing the boom from rotating on its longitudinal axis, and, a demountable means for causing said upper truss member to be demountably attached to said outer end-portion of said truss post, wherein the boom and the upper truss member are quickly and easily removable from, respectively, the rear leg and the truss post.

4. The support apparatus of claim 3, further including, a quick-release locking means for securing each one of the two front legs in their extended support positions wherein the apparatus can be lifted off the ground and moved with the front legs secured in their extended positions, and, the apparatus can be tilted forward and down, pivoting on the front legs, without the front legs collapsing.

5. The support apparatus of claim 4, wherein, said plurality of branch arms are constructed of rigid elongated material; and further including demountable means for causing said at least one pivot post to be demountably attached to said outer end-portion of said boom wherein said at least one pivot post, together with said plurality of branch arms, plurality of said support guys, said at least one flexible support stay, said support tie which interconnects the upper portion of said at least one pivot post and the top side of the boom, and said flexible water conduit, can be quickly and easily connected to and disengaged from the outer end-portion of the boom.

6. The support apparatus of claim 5, wherein, the rear leg and each of the two front legs are constructed of rigid material.

* * * * *